US009868449B1

(12) United States Patent
Holz et al.

(10) Patent No.: US 9,868,449 B1
(45) Date of Patent: Jan. 16, 2018

(54) RECOGNIZING IN-AIR GESTURES OF A CONTROL OBJECT TO CONTROL A VEHICULAR CONTROL SYSTEM

(71) Applicant: Leap Motion, Inc., San Francisco, CA (US)

(72) Inventors: David S. Holz, San Francisco, CA (US); Hua Yang, Millbrae, CA (US); Robert Samuel Gordon, San Bruno, CA (US); Neeloy Roy, San Francisco, CA (US); Justin Schunick, Oakland, CA (US); Paul A. Durdik, Foster City, CA (US)

(73) Assignee: Leap Motion, Inc., San Francisco, CA (US)

( * ) Notice: Subject to any disclaimer, the term of this patent is extended or adjusted under 35 U.S.C. 154(b) by 27 days.

(21) Appl. No.: 14/725,510

(22) Filed: May 29, 2015

Related U.S. Application Data

(60) Provisional application No. 62/005,981, filed on May 30, 2014.

(51) Int. Cl.
*B60W 50/10* (2012.01)
*G06K 9/00* (2006.01)
*G06F 3/01* (2006.01)

(52) U.S. Cl.
CPC ............ *B60W 50/10* (2013.01); *G06F 3/017* (2013.01); *G06K 9/00355* (2013.01); *G06K 9/00362* (2013.01); *B60W 2540/00* (2013.01); *G06T 2207/10152* (2013.01); *G06T 2207/30196* (2013.01)

(58) Field of Classification Search
CPC .............. B60W 50/10; B60W 2540/00; G06K 9/00362; G06K 9/00355; G06F 3/017; G06T 2207/30196; G06T 2207/10152
See application file for complete search history.

(56) References Cited

U.S. PATENT DOCUMENTS

| | | | |
|---|---|---|---|
| 7,050,606 B2 | 5/2006 | Paul et al. | |
| 7,289,645 B2 | 10/2007 | Yamamoto et al. | |
| 7,454,136 B2 * | 11/2008 | Raskar .................. | G03B 15/03 348/222.1 |
| 8,396,252 B2 | 3/2013 | El Dokor | |
| 8,744,645 B1 | 6/2014 | Vaghefinazari et al. | |
| 8,781,171 B2 | 7/2014 | King et al. | |
| 8,942,881 B2 | 1/2015 | Hobbs et al. | |
| 9,063,574 B1 * | 6/2015 | Ivanchenko ............ | G06F 3/017 |
| 9,477,314 B2 * | 10/2016 | Alameh .................. | G06F 3/017 |
| 2005/0063564 A1 | 3/2005 | Yamamoto et al. | |
| 2007/0025717 A1 * | 2/2007 | Raskar .................. | G03B 15/03 396/155 |
| 2008/0043108 A1 * | 2/2008 | Jung ...................... | H04N 5/232 348/207.1 |
| 2009/0073275 A1 * | 3/2009 | Awazu .................... | G03B 7/16 348/222.1 |
| 2009/0278915 A1 | 11/2009 | Kramer et al. | |
| 2013/0156296 A1 * | 6/2013 | El Dokor ............... | G06F 3/017 382/154 |

(Continued)

*Primary Examiner* — Rami Khatib
*Assistant Examiner* — Jeffrey Boomer
(74) *Attorney, Agent, or Firm* — Haynes Beffel & Wolfeld LLP; Ernest J. Beffel, Jr.

(57) ABSTRACT

The technology disclosed relates to an embeddable motion sensory control device that detects gestures in a three dimensional (3D) sensory space within a vehicle cabin, detecting a gesture in the 3D sensory space and interpreting the gesture as a command to a (sub) system of the vehicle under control, and issuing the command when appropriate.

22 Claims, 28 Drawing Sheets

(56) References Cited

U.S. PATENT DOCUMENTS

| | | | |
|---|---|---|---|
| 2013/0182077 A1* | 7/2013 | Holz | H04N 5/232 348/46 |
| 2013/0182246 A1* | 7/2013 | Tanase | G06F 3/042 356/218 |
| 2013/0182902 A1* | 7/2013 | Holz | G06K 9/3233 382/103 |
| 2013/0204457 A1 | 8/2013 | King et al. | |
| 2013/0261871 A1 | 10/2013 | Hobbs et al. | |
| 2013/0271370 A1* | 10/2013 | Wang | G06F 3/017 345/158 |
| 2013/0329015 A1* | 12/2013 | Pulli | H04N 13/0253 348/47 |
| 2014/0099019 A1* | 4/2014 | El Dokor | G06F 3/017 382/154 |
| 2014/0118257 A1* | 5/2014 | Baldwin | G06F 3/017 345/158 |
| 2014/0201666 A1* | 7/2014 | Bedikian | G06F 3/017 715/771 |
| 2015/0016777 A1 | 1/2015 | Abovitz et al. | |
| 2015/0049017 A1* | 2/2015 | Weber | G06F 3/017 345/156 |
| 2015/0199025 A1* | 7/2015 | Holz | G06K 9/00355 345/156 |
| 2015/0211919 A1* | 7/2015 | Julian | G06F 3/017 250/201.1 |
| 2015/0227210 A1* | 8/2015 | Chen | G06F 3/016 345/156 |
| 2015/0332475 A1* | 11/2015 | Shroff | H04N 5/23254 382/103 |
| 2016/0239080 A1* | 8/2016 | Marcolina | G06F 3/011 |

\* cited by examiner

RECOGNIZING IN-AIR GESTURES OF A CONTROL OBJECT TO CONTROL A VEHICULAR CONTROL SYSTEM

PRIORITY DATA

The application claims the benefit of U.S. Provisional Patent Application No. 62/005,981, entitled, "VEHICLE MOTION SENSORY CONTROL," filed on 30 May 2014. The provisional application is hereby incorporated by reference for all purposes.

FIELD OF THE TECHNOLOGY DISCLOSED

The present disclosure relates generally to human machine interface and in particular to touch-less controls for automobiles and other vehicles.

INCORPORATIONS

Materials incorporated by reference in this filing include the following:

PREDICTIVE INFORMATION OR FREE SPACE GESTURE CONTROL AND COMMUNICATION, U.S. Prov. App. No. 61/871,790, filed 29 Aug. 2013, PREDICTIVE INFORMATION FOR FREE-SPACE GESTURE CONTROL AND COMMUNICATION, U.S. Prov. App. No. 61/873,758, filed 4 Sep. 2013, PREDICTIVE INFORMATION FOR FREE SPACE GESTURE CONTROL AND COMMUNICATION, U.S. Prov. App. No. 61/898,462, filed 31 Oct. 2013, INITIALIZING PREDICTIVE INFORMATION FOR FREE SPACE GESTURE CONTROL AND COMMUNICATION, U.S. Prov. App. No. 61/911,975, filed 4 Dec. 2013, INITIALIZING ORIENTATION IN SPACE FOR PREDICTIVE INFORMATION FOR FREE SPACE GESTURE CONTROL AND COMMUNICATION, U.S. Prov. App. No. 61/924,193, filed 6 Jan. 2014, ENHANCED CONTRAST FOR OBJECT DETECTION AND CHARACTERIZATION BY OPTICAL IMAGING, U.S. application Ser. No. 13/742,845, filed 16 Jan. 2013, WEARABLE AUGMENTED REALITY DEVICES WITH OBJECT DETECTION AND TRACKING, U.S. Prov. App. No. 62/001,044 filed 20 May 2014, and BIOMETRIC AWARE OBJECT DETECTION AND TRACKING, U.S. Prov. App. No. 61/952,843, filed 13 Mar. 2014.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The first dashboard consisted of a board placed in front of the driver of a carriage to shield him from debris cast off the horses' hooves. As vehicles became more complex, and mechanical motive power supplanted the horse, controls for various systems (environmental, safety, entertainment and so forth) proliferated. The dashboard was retained as a convenient place for various controls. The operator's attention must be removed from the road (or runway, rail or sea-lane) to "hunt" for the knob or switch, hopefully labelled in his or her own language. In the 1970s, replacing English language labels with international symbols made the dashboard equally non-understandable to everyone everywhere. The need arose for a more simplified interface became apparent and joysticks, keyboards or keypads, glass cockpits, etc. have been pressed into service. But complexity— and confusion—still proliferated.

Some have looked to motion capture to provide the interface. Conventional motion capture approaches, however, rely on markers or sensors worn by the subject while executing activities and/or rely on the strategic placement of numerous bulky and/or complex equipment in specialized and rigid environments to capture subject movements. Unfortunately, such systems tend to be expensive to construct and impractical to use in the vehicle cabin. Markers or sensors worn by the operator can be cumbersome and interfere with natural movement. Optical based systems involve large numbers of cameras and tend not to operate in real time, due to the volume of data that needs to be analyzed and correlated. Changing and uncontrollable lighting situations, background objects, etc. pose further challenges to the use of optical components. To date, such considerations have limited the deployment and use of motion capture technology in the vehicle cabin to little more than non-functional pipe dreams.

Consequently, there is a need for providing the ability to interact with the vehicle control environment without having to fumble around for buttons, switches, joysticks and so forth in real time without fixed or difficult to configure sensors or markers.

SUMMARY

Implementations of the technology disclosed address these and other problems by providing methods and systems for providing capabilities to control and/or interact with the vehicle cabin environment to the operator and/or other occupants of the vehicle using a sensor configured to capture motion and/or determining the path of by capturing the motion of occupant's body based on imaging, acoustic or vibrational waves. Implementations can enable improved user experience, greater safety, greater functionality to operators of vehicles for machine control and/or machine communications applications, e.g., autonomous and semi-autonomous robotic vehicles, factory floor material handling vehicles, autonomous and semi-autonomous mass-transit vehicles, automobiles (human or machine driven), aircraft, ships, rail, and so forth, equipped with suitable sensors and processors employing optical, audio or vibrational detection.

In one implementation, described is a method of recognizing in-air gestures of a control object to control a vehicular control system. The method includes determining observation information characterizing in-air gestural motion of a control object from at least one image captured at time t0. It also includes constructing a 3D model to represent the control object by fitting one or more 3D solid subcomponents to a construct of the control object defined by the observation information based on the image captured at time t0. The method further includes improving conformance of the 3D model to the modified observation information responsive to modifications in the observation information based on another image captured at time t1, wherein the control object moved between t0 and t1. This improvement is achieved by determining an error indication between a point on another construct of the control object defined by the observation information based on the image captured at time t1 and a corresponding point on at least one of the 3D solid subcomponents fitted to the construct defined by the observation information based on the image captured at time t0. The method further includes adjusting the 3D model responsive to the error indication. Finally, the method includes interpreting motions of the control object determined based at least in part from the adjusting the 3D model as one or more gestures providing command input to a vehicular control system.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as in different sections of this application such as capsule hand, initialization, scaling, orientation, association, alignment, correction, abstracting, clutter reduction, image capture, augmented vehicle experience, biometrics, and/or operator disambiguation.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, described is a method of recognizing speedy in-air gestures of a control object in uncontrolled lighting situations of a vehicle environment. The method includes scanning a field of view by selectively illuminating for short durations respective ones of a pre-determined plurality of directionally oriented light sources that have overlapping fields of illumination. It includes measuring one or more differences in intensity of returning light emitted from the respective light sources and reflected from a control object in the vehicle environment. The method also includes analyzing the reflected light across a series of image frames for periodic brightness variations. It further includes determining positional information of the control object based at least in part upon one or more measured differences in intensity of the returning light.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as in different sections of this application such as capsule hand, initialization, scaling, orientation, association, alignment, correction, abstracting, clutter reduction, image capture, augmented vehicle experience, biometrics, and/or operator disambiguation.

In some implementations, the short periods are in order of 5 to 40 microseconds.

In some implementations, the pre-determined plurality of directionally oriented light sources includes between six to sixteen light sources.

In one implementation, a rate of selective illumination of the light sources is determined by measuring one or more frequencies of the periodic brightness variations.

In another implementation, the method further includes varying a rate of capture of the series of image frames.

In some implementations, selectively illuminating the respective light sources further includes varying brightness of pairs of overlapping light sources by dimming a first, initially on light source while brightening a second, initially off light source.

In one implementation, the method further includes capturing the image frames at a low-resolution by analyzing a reduced amount of image data lines per image frame.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In a yet further implementation, described is a method of capturing in-air gestures of a control object in a passenger vehicle compartment. The method includes capturing a field of view in ambient lighting conditions, capturing the field of view while illuminated by a flash, differencing the ambient capture and the flash capture to produce a clean image capture with reduced ambient lighting effects, analyzing the clean image capture to construct a 3D model of a control object in the field of view, following gestures of the 3D model of the control object by repeated producing and analyzing clean image captures of the control object, and interpreting the gestures and outputting one or more control streams based on the interpretation of the gestures.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as in different sections of this application such as capsule hand, initialization, scaling, orientation, association, alignment, correction, abstracting, clutter reduction, image capture, augmented vehicle experience, biometrics, and/or operator disambiguation.

In some implementations, the flash has a duration of 5 to 300 microseconds.

In other implementations, the flash has a duration of 5 to 40 microseconds.

In one implementation, the flash is produced by six to sixteen LEDs.

In another implementation, the flash is produced by LEDs designed to mix wide beams and narrow beams.

In some implementations, the flash is produced by LEDs operating in an ultraviolet frequency range and the capturing further includes using an ultraviolet (UV) sensitive or UV filtered camera.

In other implementations, the flash is produced by LEDs operating in an infrared (IR) frequency range and the capturing further includes using an IR sensitive or IR filtered camera.

In one implementation, the flash capture is timed with the flash to reduce capture from ambient lighting.

In another implementation, the flash capture duration brackets the flash and lasts no more than four times the flash duration, to reduce capture from ambient lighting.

In some implementations, the method includes one or more sensors alternating between ambient captures and flash captures during at least part of the gesture capture and analysis. In such implementations, the one or more sensors operate, at least part time, at a reduced resolution that is half or less of the available sensor resolution and at an increased capture rate enabled by the reduced resolution.

In other implementations, the method includes one or more sensors capturing binocular views in of at least the flash captures. In such implementations, differencing produces clean binocular captures and the 3D model of the control object is constructed from the clean binocular views.

In one implementation, the differencing to produce clean captures further includes comparing the flash capture to one or more ambient captures immediately before or after the flash capture.

In another implementation, the differencing to produce clean captures further includes comparing the flashes capture to two or more ambient captures immediately before and after the flash capture.

In some other implementations, the method further includes capturing at least flash images of the passenger vehicle compartment and creating a 3D model of non-control object features. In such implementations, when gestures of the 3D model of the control object are constructed and followed, the non-control object features of the passenger vehicle compartment are taken into account.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The technology disclosed relates to controlling a vehicle (or (sub-) systems of the vehicle) using gestures. Image(s) can be captured including a body portion of an occupant of the vehicle. Observed information characterizing the body portion is determined from the images. Predictive information including a model is determined from the observed information. Variations in the observed information motions indicating gestures made by the occupant can be determined. Then, it is determined whether to issue a command to the vehicle based in part upon the gesture and the occupant. For example, biometric information gathered about the occupant can be used to determine whether the occupant making the gesture is the operator of the vehicle and therefore authorized to make gestures indicating commands to control systems of the vehicle. Other occupant (e.g., co-pilot, navigation officer, or passenger) gestures can be identified, and permitted or rejected based upon the role that the occupant is assigned.

In some implementations, the effects of sunlight, reflections off windshields, windows or sunroofs, or other extraneous sources can be reduced by adjusting activation states of illumination sources relative to the frame capture rate of the camera(s) to make the sun (or other source) appear dimmer to the cameras during the time of capture relative to the illumination sources. In some implementations, effects of sunlight are reduced by operating camera(s) in low resolution mode to increase signal to noise ratio. In some implementations, the effects of sunlight are reduced by combining pixels of images taken in higher resolution modes to arrive at a low resolution image. In some implementations, sunlight effects are reduced by turning the illumination sources on and off every other frame; determining difference images from a set of three sequential frames by subtracting pixel values of a frame captured with the sources off from a frame captured with the sources on; and subtracting pixel values of the difference frames; thereby removing light that exists during frames taken with the sources off.

In some implementations, a virtualized display including one or more objects with which the occupant can interact using gesture is presented. The virtualized display can be presented by using a heads up display (HUD), a head mounted display device (HMD), a display incorporated into the vehicle, one or more projectors, including visual, audio and haptic, or combinations thereof. Objects presented can include objects associated with applications, objects representing an operational parameter of the vehicle, advertising objects, objects representing more abstract things, other types of objects, and combination objects.

Soft biometrics (e.g., hand size, occupant seat, etc.) can be used to select non-security or non-critical functions (e.g., seat positions, mirror settings, steering wheel (or other control) height settings, and other parameters (steering stiffness, suspension stiffness, low rider capabilities, favorite radio stations, playlists, pairing correct cell phone, etc.). Secure biometrics (e.g., fingerprints, vein pattern recognition, hand line recognition, voice identity, retinal pattern scans, etc.) can be used to identify authorized vehicle operators (e.g., pilots, co-pilots, crewmembers, ships captains, crew, train operators, etc.).

Other aspects and advantages of the present technology can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Figure 1A:
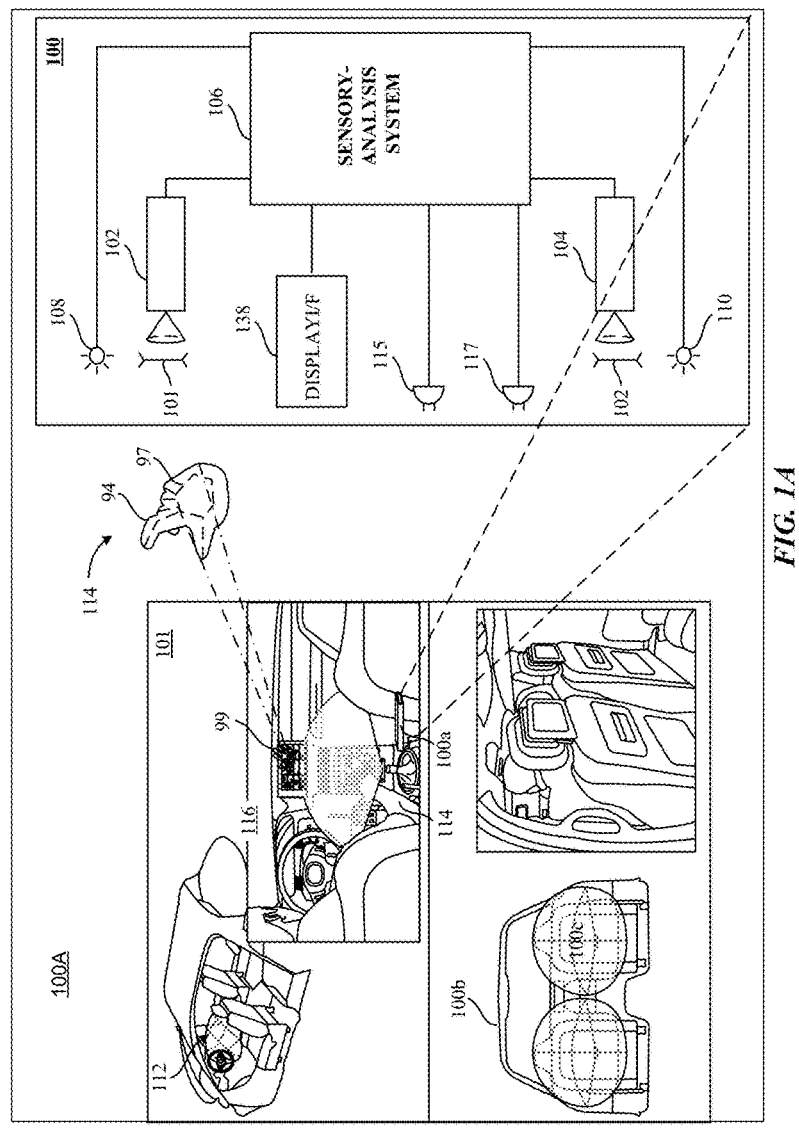
FIGS. 1A and 1B illustrate an example gesture-recognition system for capturing image data according to one implementation of the technology disclosed.

Among other aspects, the technology described herein with reference to example implementations can provide capabilities to control and/or interact with the vehicle cabin environment to the operator and/or other occupants of the vehicle using a sensor configured to capture motion and/or determining the path of by capturing the motion of occupant's body based on imaging, acoustic or vibrational waves. Implementations can enable improved user experience, greater safety, greater functionality to operators of vehicles for machine control and/or machine communications applications, e.g., autonomous and semi-autonomous robotic vehicles, factory floor material handling vehicles, autonomous and semi-autonomous mass-transit vehicles, automobiles (human or machine driven), aircraft, ships, rail, and so forth, equipped with suitable sensors and processors employing optical, audio or vibrational detection.

In some implementations, projection techniques can supplement the sensory based tracking with presentation of virtual (or virtualized real) objects (visual, audio, haptic, and so forth) created by applications loadable to, or in cooperative implementation with, the motion sensor system to provide an operator with an enhanced experience supplemented by virtualized real world parameters (e.g., 3D projections of engine parameters, status indicators, and so forth).

Implementations include providing a "pass-through" in which live video is provided to the user of the virtual reality device, either alone or in conjunction with display of one or more virtual objects, enabling the user to perceive the real world directly. Accordingly, the user is enabled to see an actual desk environment as well as virtual applications or objects intermingled therewith. Gesture recognition and sensing enables implementations to provide the user with the ability to grasp or interact with objects real (e.g., the user's coke can) alongside the virtual (e.g., a virtual document floating above the surface of the user's actual desk. In some implementations, information from differing spectral sources is selectively used to drive one or another aspect of the experience. For example, information from IR sensitive sensors can be used to detect the user's hand motions and recognize gestures. While information from the visible light region can be used to drive the pass through video presentation, creating a real world presentation of real and virtual objects. In a further example, combinations of image information from multiple sources can be used; the system—or the user—selecting between IR imagery and visible light imagery based upon situational, conditional, environmental or other factors or combinations thereof. For example, the device can switch from visible light imaging to IR imaging when the ambient light conditions warrant. The user can have the ability to control the imaging source as well. In yet further examples, information from one type of sensor can be used to augment, correct, or corroborate information from another type of sensor. Information from IR sensors can be used to correct the display of imaging conducted from visible light sensitive sensors, and vice versa. In low-light or other situations not conducive to optical imaging, where free-form gestures cannot be recognized optically with a sufficient degree of reliability, audio signals or vibrational waves can be detected and used to supply the direction and location of the object as further described herein.

Refer first to FIG. 1A, which illustrates an example gesture-recognition system 100A for capturing image data according to one implementation of the technology disclosed. System 100A is preferably implemented with a vehicle cabin 101 either in front seat, back seat, or combinations thereof, such as shown in FIG. 1A, employing a sensor 100, which can be affixed to dashboard 116, console between front seat passengers, e.g., sensor 100a, affixed to the cabin roof, e.g., sensor 100b, imbedded into the backs of the front seats, e.g., sensor 100c, other locations, or combinations thereof. System 100A includes any number of cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. In some implementations, as illustrated by sensor 100a, the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. In an alternative implementation, shown by sensor 100c, the sensor is disposed along the motion detected, e.g., where the hand 114 is expected to move.

In some implementations, the illustrated system 100A includes one or more illumination sources 108, 110, which can be disposed to illuminate region of interest 112 in which one or more portions of the operator (or occupant's) body (e.g., hand 114) (in this example a hand) that may optionally hold a tool or other object of interest and cameras 102, 104 are oriented toward the region 112 to capture video images of the hand 114. The operation of illumination sources 108, 110 and cameras 102, 104 is controlled by sensory-analysis system 106 which can be, e.g., a computer system, control logic implemented in hardware and/or software or combinations thereof. Based on the captured images, sensory-analysis system 106 determines the position and/or motion of object (e.g., hand 114).

In one implementation, the illumination sources 108, 110 are infrared light sources. For example, the light sources can be, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 121, 122 are placed in front of cameras 102, 104 to filter out extraneous light so that only the light provided by illumination sources 108, 110 is registered in the images captured by cameras 102, 104.

In another implementation, one or more sonic transducers 115, 117 are sonic sources sending sonic energy and detecting reflected sonic energy used in conjunction with, or instead of, cameras 102, 104 and illumination sources 108, 110. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans.

The illustrated system 100 can include any of various other sensors not shown in FIG. 1A for clarity, alone or in various combinations, to enhance the experience provided to the operator of vehicle 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval.

It should be stressed that the arrangement shown in FIG. 1A is representative and not limiting. For example, lasers or other light sources can be used instead of LEDs. Visible light can be used instead of infrared light. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

Figure 1B:
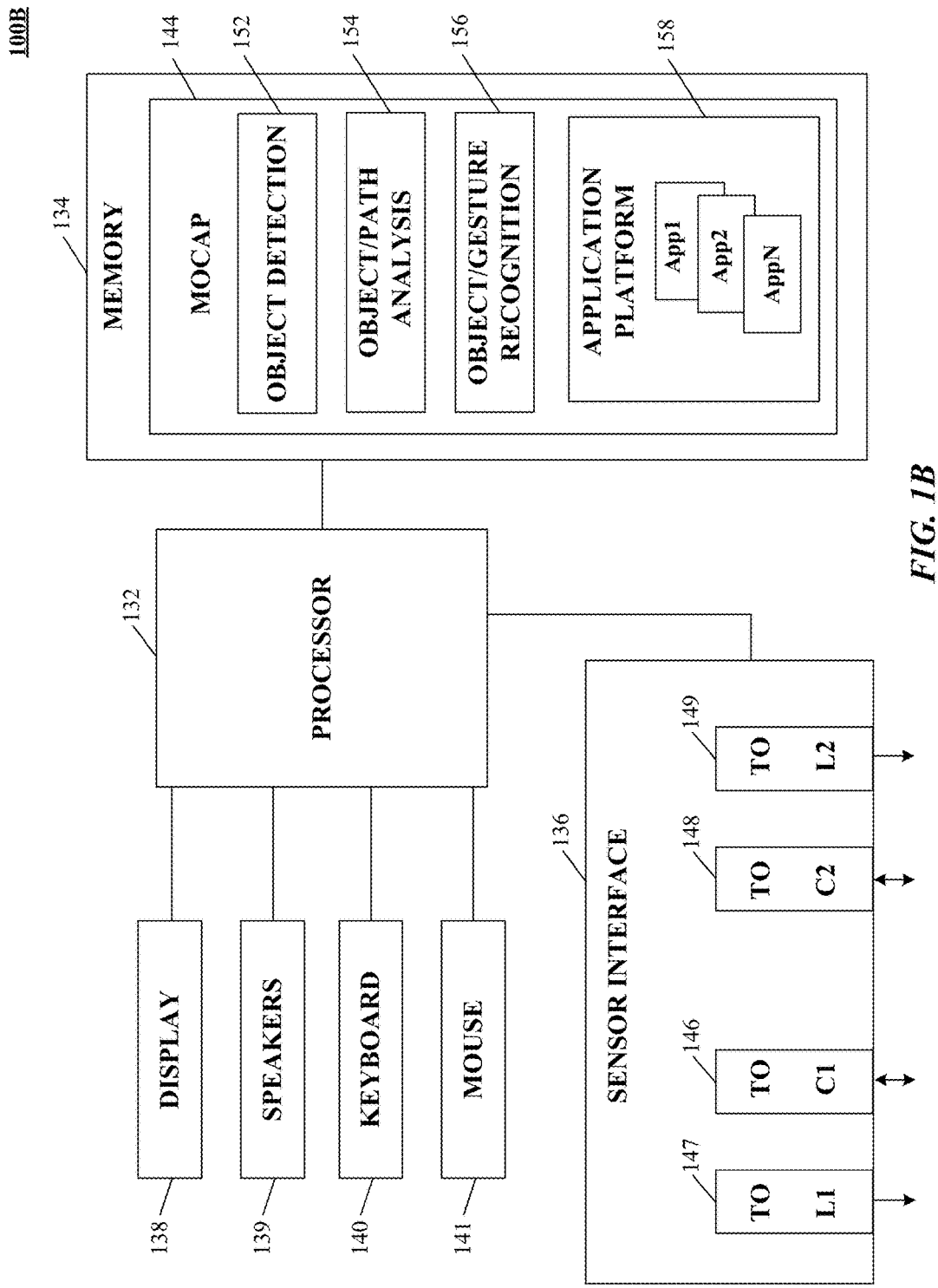

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 for providing a virtualized rendering 99 including one or more virtualized constructions 94, 97 of hand 114 (or other presentation mechanism(s), e.g. holographic projection systems, wearable goggles or other head mounted devices (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below that control the operation of processor 132 and its interaction with other hardware components. An operating system directs the execution of low-level, basic system functions such as memory allocation, file management, and operation of mass storage devices. The operating system can include a variety of operating systems such as the Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, the OPENACTION operating system, iOS, Android or other mobile operating systems, or another operating system platform.

The computing environment 100B can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG.

1A, as well as associated light sources such as illumination sources 108, 110 of FIG. 1A. Thus, for example, sensor interface 136 can include one or more data ports 146, 148 to which cameras can be connected, as well as hardware and/or software signal processors that modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Sensor interface 136 can also include controllers 147, 149, to which light sources (e.g., illumination sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object/path analysis module 154, and an object/gesture-recognition module 156. Object detection module 152 can analyze images (e.g., images captured via sensor interface 136) to detect edges of an object therein and/or other information about the object's location. Object/path analysis module 154 can analyze the object information provided by object detection module 152 to determine a 3D position and/or motion of the object (e.g., a user's hand 114). Examples of operations that can be implemented in code modules of mocap program 144 are described below. Memory 134 can also include other information and/or code modules used by mocap program 144 such as an application platform 158 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, or use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., googles, head mounted devices (HMDs), wrist computers, and so on. A particular implementation can include other functionality not described herein, e.g., wired and/or wireless network interfaces, media playing, and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Again referring to FIGS. 1A and 1B, the user performs a gesture that is captured by cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the object/gesture-recognition module 156, which can be implemented as another module of the mocap 144. In an exemplary implementation, object/gesture-recognition module 156 provides input to an electronic device, allowing a user to remotely control the electronic device, and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the sensory-analysis system 106 can not only recognize gestures for purposes of providing input to the electronic device, but can also capture the position and shape of user's hand in consecutive video images in order to characterize the hand gesture in 3D space and reproduce it on display 138.

In one implementation, the object/gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Capsule Hand

Figure 2A:
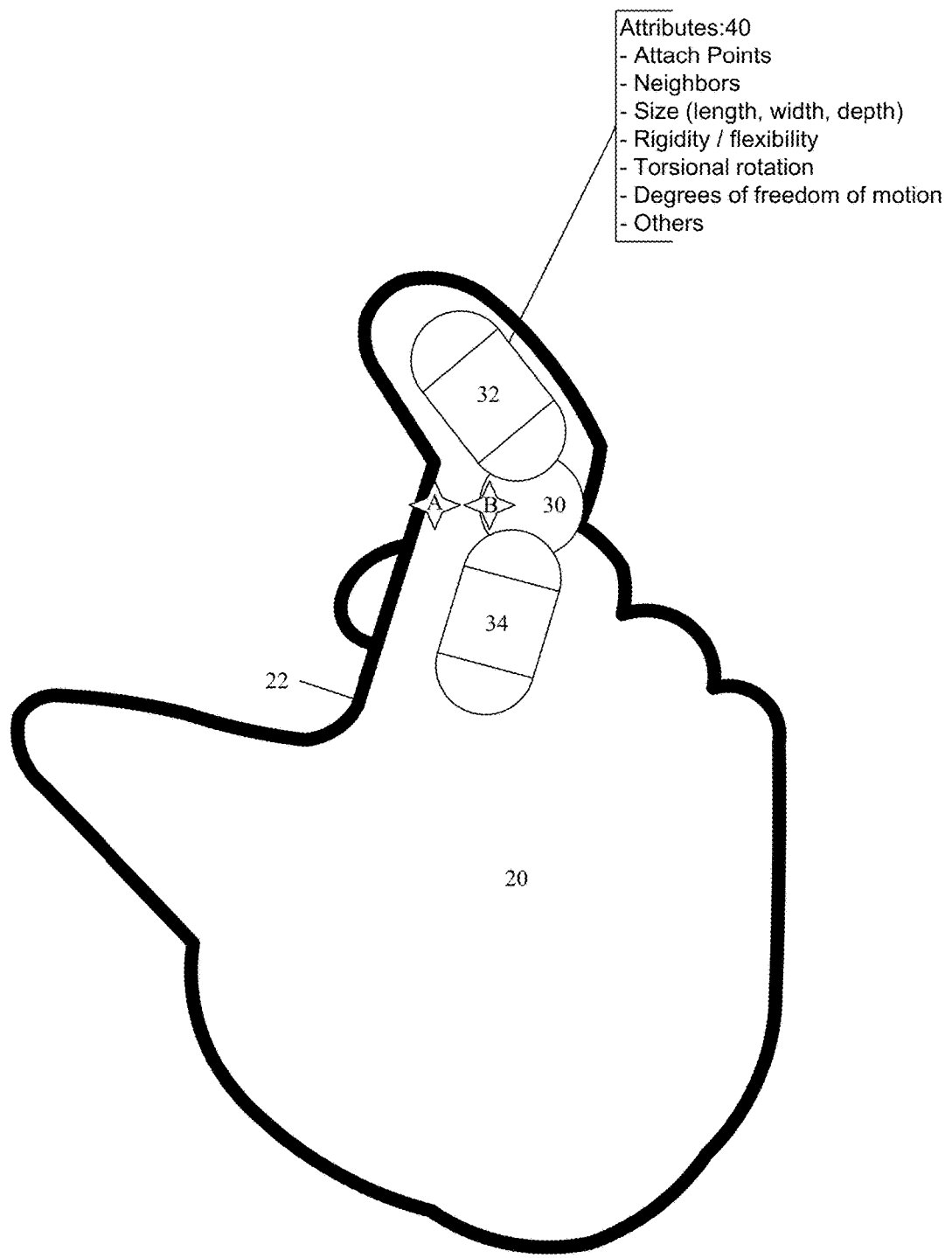
FIGS. 2A, 2B, 2C, and 2D illustrate one implementation of capsule representation of predictive information in accordance with implementations of the technology disclosed.

FIGS. 2A, 2B, 2C, and 2D illustrate one implementation of capsule representation of predictive information. FIG. 2A is a simplified illustration of prediction information for an object according to an implementation. As illustrated by FIG. 2A, prediction information 20 of a control object (e.g., hand 114 of FIG. 1A) (also interchangeably referred to as an "object of interest" or "hand") can be constructed from one or more model subcomponents 30, 32, 34 selected and/or configured to represent at least a portion of a surface of control object (e.g., hand 114), one or more attributes 40, and virtual surface portion 22. Other components can be included in prediction information 20, not shown in FIG. 2A for clarity sake. In an implementation, the model subcomponents can be selected from a set of radial solids, which can reflect at least a portion of the control object (e.g., hand 114) in terms of one or more of structure, motion characteristics, conformational characteristics, other types of characteristics of control object (e.g., hand 114), and/or combinations thereof. In one implementation, radial solids are objects made up of a 2D primitive (e.g., line, curve, plane) and a surface having a constant radial distance to the 2D primitive. A closest point to the radial solid can be computed relatively quickly. As used herein, three or greater capsules are referred to as a "capsoodle".

One radial solid implementation includes a contour and a surface defined by a set of points having a fixed distance from the closest corresponding point on the contour. Another radial solid implementation includes a set of points normal to points on a contour and a fixed distance therefrom. In an implementation, computational technique(s) for defining the radial solid include finding a closest point on the contour and the arbitrary point, then projecting outward the length of the radius of the solid. In an implementation, such projection can be a vector normal to the contour at the closest point. An example radial solid (e.g., 32, 34) includes a "capsuloid", i.e., a capsule shaped solid including a cylindrical body and semi-spherical ends. Another type of radial solid (e.g., 30) includes a sphere. Other types of radial solids can be identified based on the foregoing teachings.

One or more attributes 40 can define characteristics of a model subcomponent 32. Attributes can include e.g., sizes, rigidity, flexibility, torsion, zero or more degrees of freedom of motion with respect to one or more defined points, which can include endpoints for example. In an implementation, predictive information about the control object can be formed to include a model of the control object (e.g., hand 114) together with attributes defining the model and values of those attributes.

In an implementation, when control object (e.g., hand 114) morphs, conforms, and/or translates, motion information reflecting such motion(s) is included into the observed information. Points in space can be recomputed based on the new observation information. Responsively, the model subcomponents can be scaled, sized, selected, rotated, translated, moved, or otherwise re-ordered to enable portions of the model corresponding to the virtual surface(s) to conform within the set of points in space.

Figure 2B:
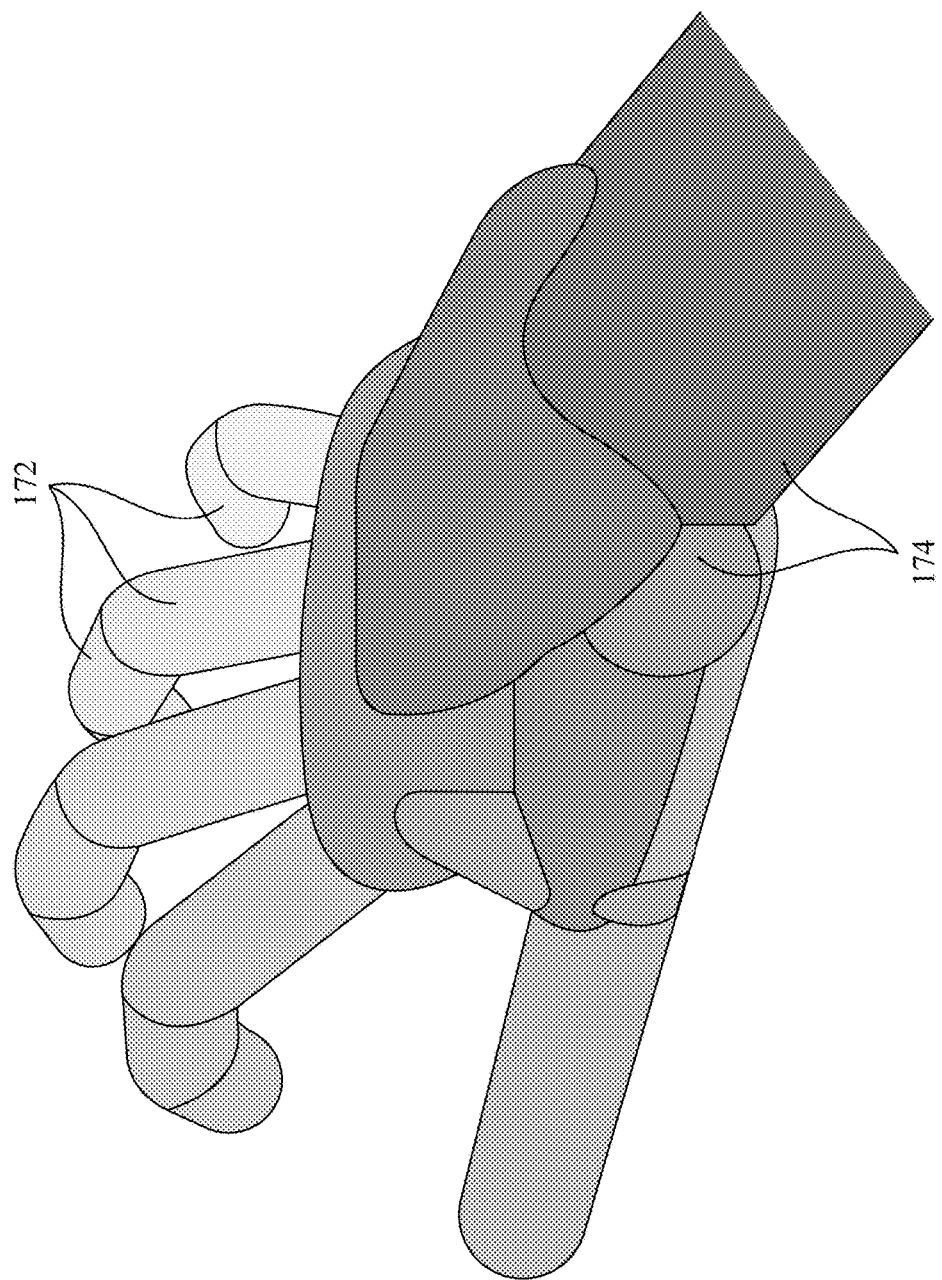
Figure 2C:
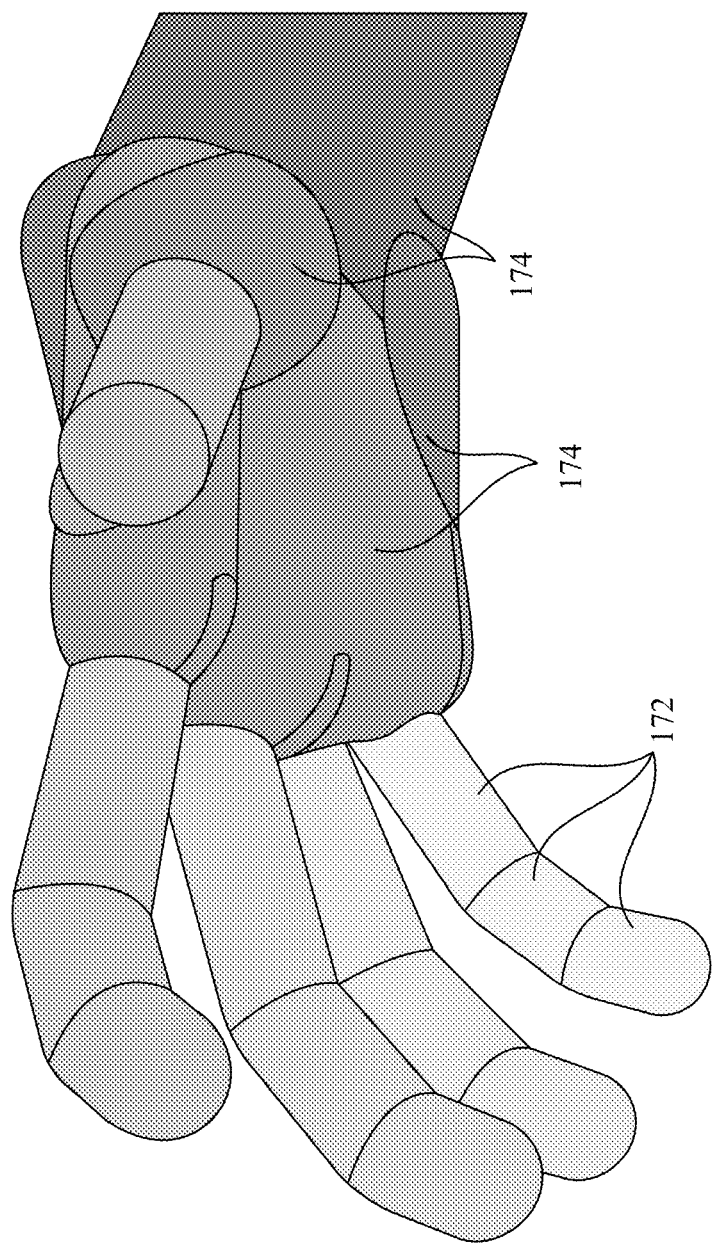
Figure 2D:
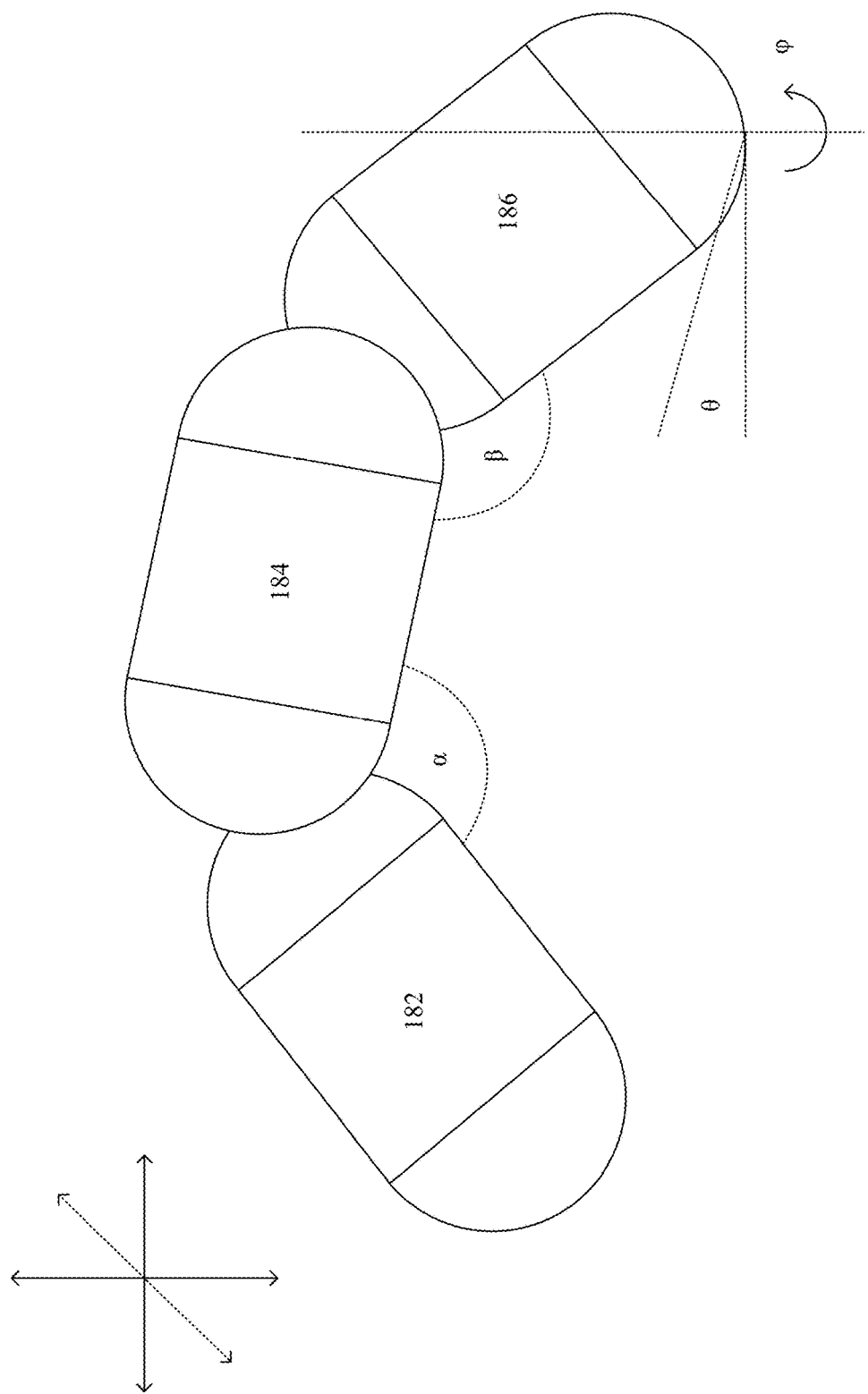

In an implementation and with reference to FIGS. 2B and 2C, a collection of radial solids and/or capsuloids can be considered a "capsule hand". A number of capsuloids 172, e.g. five capsuloids, are used to represent fingers on a hand while a number of radial solids 174 are used to represent the shapes of the palm and wrist. With reference to FIG. 2D, a finger capsuloid with radial solids 182, 184, 186 can be represented by its two joint angles ($\alpha$, $\beta$), pitch ($\theta$), and yaw ($\varphi$). In an implementation, the angle $\beta$ can be represented as a function of joint angle $\alpha$, pitch $\theta$, and yaw $\varphi$. Allowing angle $\beta$ to be represented this way can allow for faster representation of the finger capsuloid with fewer variables; see, e.g., U.S. Ser. Nos. 61/871,790, filed 29 Aug. 2013 and 61/873,758, filed 4 Sep. 2013. For example, one capsule hand can include five capsules for each finger, a radial polygon defining a base of a hand and a plurality of definitional capsules that define fleshy portions of the hand.

In one implementation, analyzing includes stereo matching, depth maps, finding contours and/or feature points reduced to certain finite number of degrees of freedom. Such an analysis enables simplification of problems of IK, sampling sizes, pose determination, etc.

Initialization

FIGS. 3A, 3B, 3C, 3D, 3E, 3F, 3G, and 3H illustrate one implementation of initializing capsule representation of predictive information. Initialization can include determining and applying one or more initialization parameters to the model to scale and orient the model.

Scaling

Figure 3A:
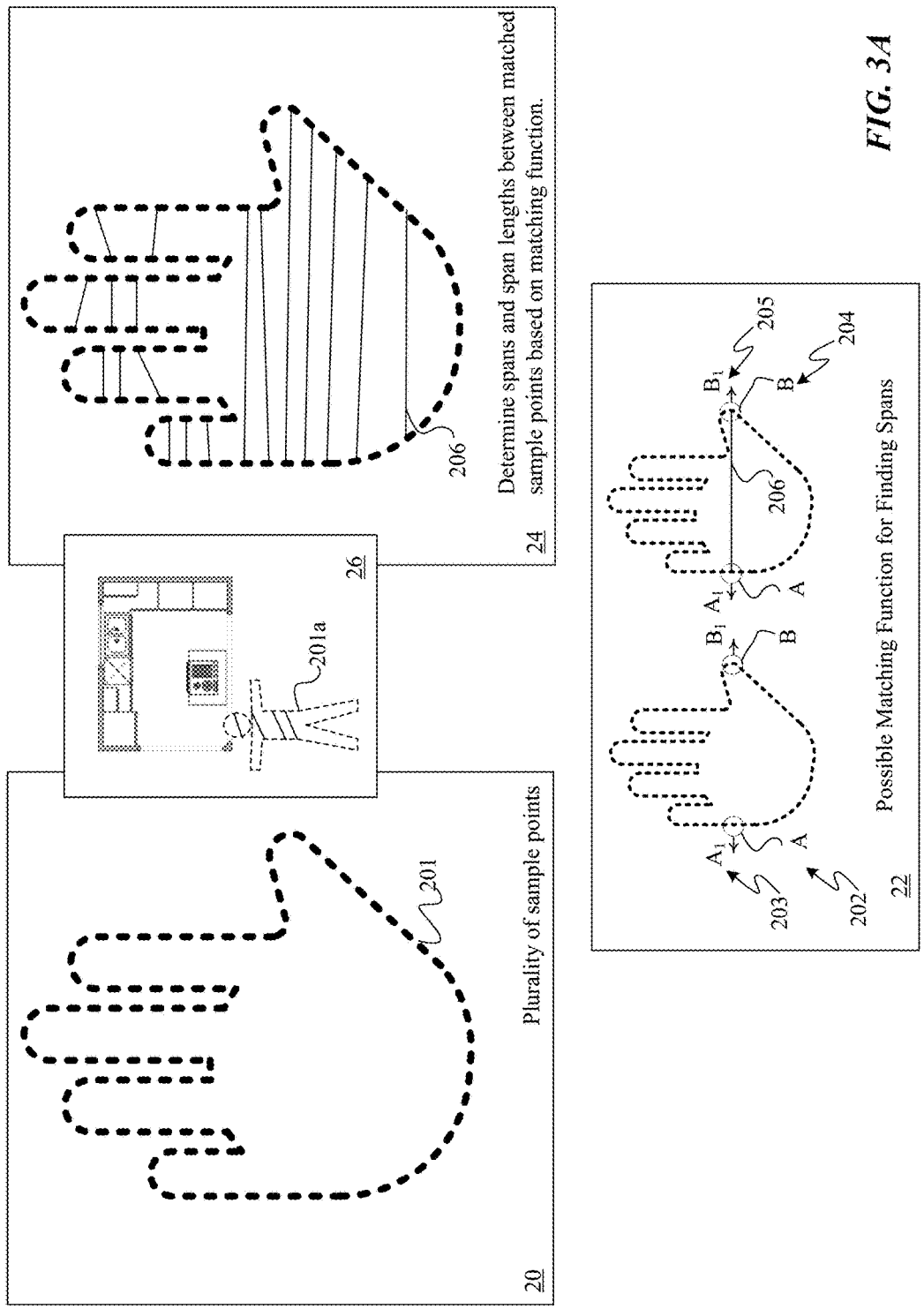
FIGS. 3A, 3B, 3C, 3D, 3E, 3F, 3G, and 3H illustrate one implementation of initializing capsule representation of predictive information in accordance with implementations of the technology disclosed.
Figure 3B:
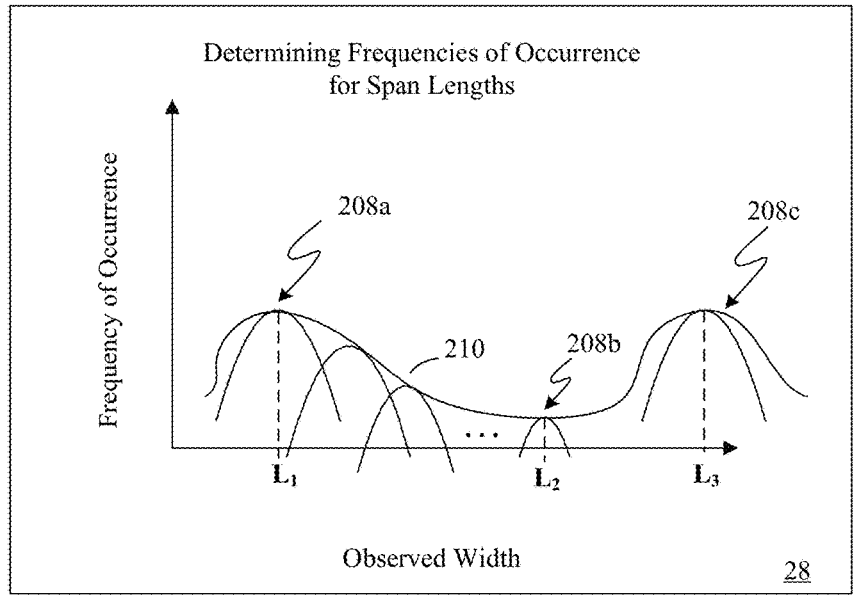
Figure 3B:
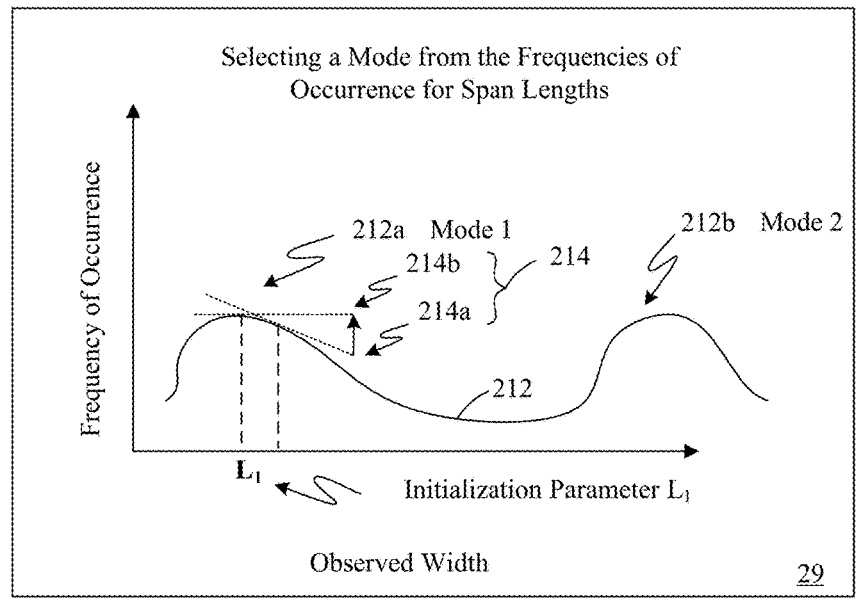
Figure 3C:
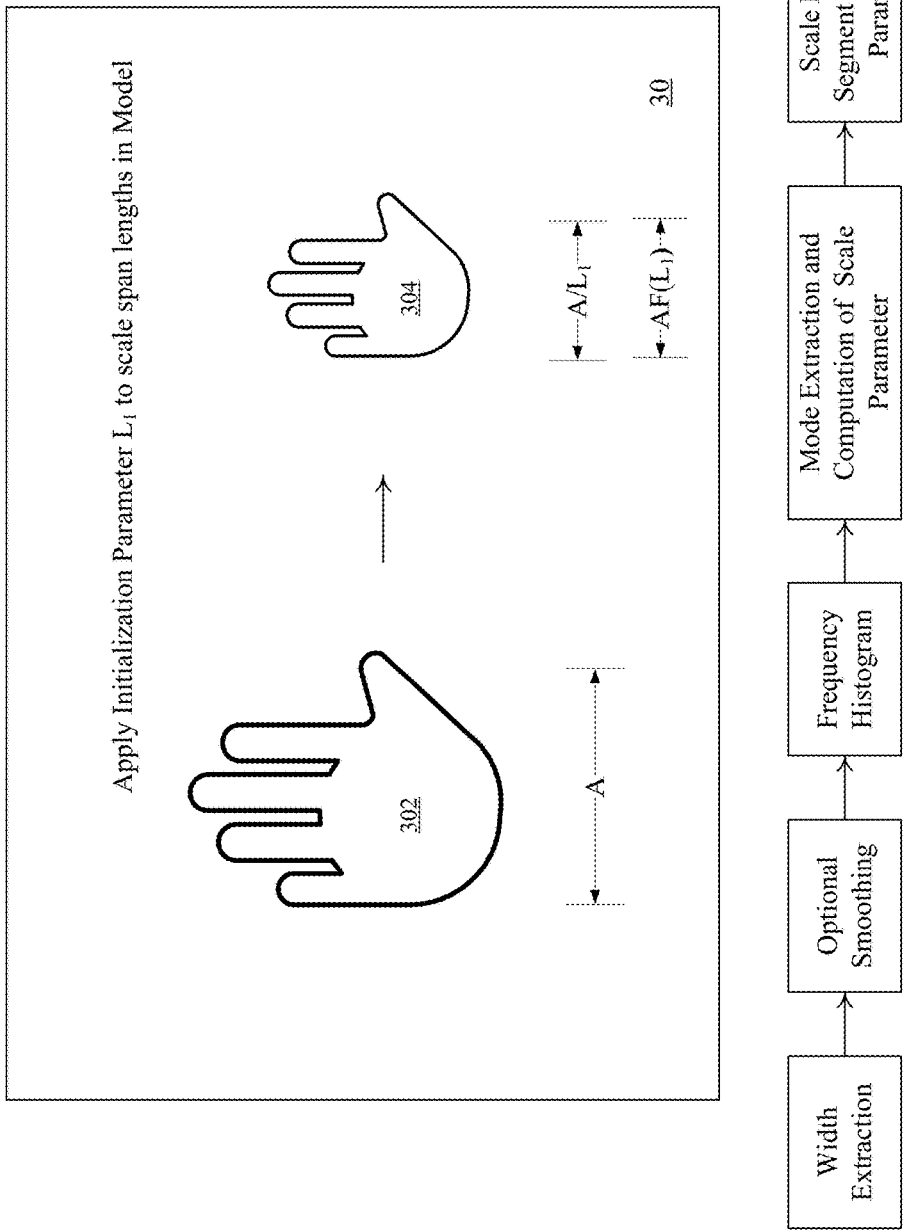

In one implementation, initialization includes scaling a model by an appropriate initialization parameter. FIG. 3A depicts determining spans and span lengths in the observed information in which one or more point pairings are selected from a surface portion as represented in the observed information. As illustrated by block 20 of FIG. 3A, an observed surface portion 201 (i.e., of observed information) can comprise a plurality of sample points from which one or more point pairings can be selected. In a block 22 of FIG. 3A, a point pairing between point A and point B of observed surface portion 201 is selected by application of a matching function, such as for example the matching function. One method for determining a point pairing using a matching function is also illustrated by FIG. 3A, in which a first unmatched (arbitrary) point A on a contour of one or more contours 202 (of block 22 of FIG. 3A) representing a surface portion of interest in the observed information is selected as a starting point. A normal $A_1$ 203 (of block 22 of FIG. 3A) is determined for point A. A wide variety of techniques for determining a normal can be used in implementations, but in one example implementation, a set of points proximate to the first unmatched point, at least two of which are not co-linear, is determined. Then, a normal for the first unmatched point can be determined using the other points in the set by determining a normal perpendicular to the plane. For example, given points $P_1$, $P_2$, $P_3$, the normal n can be given by the cross product:

$$n=(p_2-p_1)\times(p_3-p_1)$$

Another technique can be to: (i) start with the set of points; (ii) form a first vector from $P_2-P_1$; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

Again with reference to FIG. 3A, the closest second unmatched point B 204 (of block 22 of FIG. 3A) reachable by a convex curve (line 206) and having the most opposite normal $B_1$ 205 is found. Accordingly, points A and B form a point pairing. As illustrated by block 26 of FIG. 3A, the object need not be a hand (nor for that matter, even a portion of a human being).

Again with reference to FIG. 3A, a span length is determined for at least one of the one or more point pairings selected. Now with reference to block 24 of FIG. 3A, one or more spans and span lengths are determined for the one or more point pairings. In a representative implementation, a span can be found by determining a shortest convex curve for the point pairings A and B. It is determined whether the convex curve passes through any other points of the model. If so, then another convex curve 206 is determined for paired points A and B. Otherwise, the span comprises the shortest continuous segment found through paired points A and B that only intersects the model surface at paired points A and B. In an implementation, the span can comprise a convex geodesic segment that only intersects the model at two points. A span can be determined from any two points using the equation of a line fitted to the paired points A and B for example.

Again with reference to FIG. 3A, a check is made to determine whether there are any further points to process. If there are further point pairs to process, then the flow continues to process the next pair. Otherwise, frequencies of occurrence are determined for the various span lengths. One way that is used to determine frequency of occurrence is illustrated by block 28 of FIG. 3B. Block 28 shows fitting of one or more radial basis functions 208a, 208b, and 208c to the observed span lengths L1, L2 and L3. For example, a radial basis function (Gaussian or approximation thereof) can be selected for one or more observed span length values using techniques described below. A function appropriate to the implementation is applied to the radial basis functions to provide a frequency of occurrence for the span lengths. For example, in block 28 of FIG. 3B, the radial basis functions 208a, 208b, and 208c are summed to arrive at a frequency of occurrence wave 210 for the observed span lengths. (A "wave" denoting a continuous function.) Of course, in implementations, other functions (multiplication, averaging, interpolation, and so forth, and/or combinations thereof depending upon the implementation specific requirements or desirability) can be applied to the radial basis functions to arrive at a frequency of occurrence. Now, the result of applying the function to the one or more radial basis functions is provided. In an implementation, smoothing techniques (interpolation, Gaussian, bucketing, rounding, others, combinations thereof) can be applied to a discrete relationship comprising discrete point pairings to form a continuous curve.

Parameters for the radial basis functions, i.e., width of the function for example, can be selected using a variety of techniques. One technique for determining a width of a radial basis function includes selecting a radial basis function for one or more observed span length values, having one or more properties, which can be determined. For example, a variance of the dataset including the observed span lengths is determined. The variance is divided by an expectation value. Expectation values can be determined from an expected number of modes in the dataset determined from the span lengths in the observed information. For example, using horizontally disposed spans, as illustrated by FIG. 3A, observed span lengths of a hand and arm can be sorted into approximately four expected expectation values: one value corresponding to an approximate cross finger diameter length; one value corresponding to a cross the palm length; one value corresponding to a span across the palm to the thumb; and one value corresponding to a span cross the wrist length. A face can be sorted into one value. An automobile (observed from its side) can be sorted into three values: one for the cabin, windshield to rear window; one from the front bumper to the rear bumper; and one from the front of the tire to the rear of the tire. The variance divided by the expectation value is provided as a width of the radial basis function.

Other techniques for determining frequencies of occurrence for the various span lengths that can be used in implementations include bucketing—in which buckets of fixed or variable width are assigned to one or more discrete points representing span length occurrences within some range corresponding to the bucket width. The frequency of occurrences for each bucket can be combined (e.g., interpolation, summed, weighted, smoothed or other combinations, and/or combinations thereof) to produce a frequency of occurrence function.

A span length can be selected as the initialization parameter based upon the frequency of occurrences of observed span lengths. Using one or a different technique described above, an initialization parameter can be determined using a technique for performing mode selection on the frequencies of occurrence for the bucketed span lengths. One technique is mode selection, illustrated with reference to FIG. 3B, that includes determining one or more modes from the frequencies of occurrence of observed span lengths. For example, in one technique illustrated with reference to block 29 of FIG. 3B, mode 1 (212a) and mode 2 (212b) are defined by locations on the frequency occurrence wave 210 in which there exists a local minima or maxima. Accordingly, one technique for determining modes from the frequencies of occurrence comprises finding minima or maxima of the frequency of occurrence wave 210. A mode of interest, e.g., a mode having a most frequently occurring span length, can be selected.

One technique for determining minima or maxima indicating modes comprises employing a gradient descent technique. With reference to block 29 of FIG. 3B, a gradient can be determined (i.e., by taking a derivative 214 of a function representing a frequency of occurrence (for example frequency occurrence wave 210 determined above)). One or more minima 214b of the derivative 214 of the function can be determined to indicate a mode of interest. For example, one technique applies Rolle's Theorem to determine a minima (or maxima) at a point in the frequency occurrence wave 210 along some closed interval demarcated by two points on the curve having the same function value. An initialization parameter is determined from the mode of interest. For example, again with reference to block 29 of FIG. 3B, a span length $L_1$ corresponding to mode 1 (212b) is selected as the initialization parameter.

In a yet further technique, properties of the frequency of occurrence other than mode can be used to determine an initialization parameter. For example, expected value of frequency of occurrence, appearance of the number of modes, spacing between modes, other properties, and/or combinations thereof can be used to determine initialization parameters. Accordingly, a most frequently occurring span length can be used as an initialization parameter. In an alternative implementation, a least frequently occurring span length ($L_2$ in block 28 of FIG. 3B) can be returned as the initialization parameter.

In some implementations, an initialization parameter is applied to at least a portion of a model within the predictive information. Application of the initialization parameter can be used to initialize the model portion using a variety of techniques—scaling, weighting, specifying (or computing)

confidence factors, selecting model portions, and mode selection (child's hand, cat's paw, tool tip, and so forth). For example and with reference to block 30 of FIG. 3C, span length(s) of one or more portion of a model 302 in the predictive information can be scaled using the initialization parameter $L_1$ as a scaling factor to produce an initialized model 304. In implementations, scaling can include multiplying (or dividing) the span length(s) by the scaling factor. In other implementations, the scaling factor can be applied according to a function based on the scaling factor, for example, a function $F(L_1)$ that determines based at least in part upon the initialization parameter that a model portion is too large (or small) and can be used to exclude (or alter the weighting or confidence factor) for that portion in the model. In yet further implementations, the span length(s) can be scaled according to the scaling factor and one or more quantifiable characteristics can be determined from imaging the object (i.e., brightness, frequencies, and so forth). In a further implementation, a model portion is selected based at least in part upon the initialization parameter. For example, an initialization parameter can be used to select from models of adult hands, children's hands, animal paws, tool tips, and so forth. In yet further implementations, initialization parameters can be used to communicate control information to the sensory device, for example, changing power consumption profiles based on size of observed object(s), changing frame rates, selecting user modes in software (tool, hand, face discrimination), background elimination, noise elimination; see, e.g., U.S. Ser. No. 61/911,975, filed Dec. 4, 2013.

Orientation

Figure 3D:
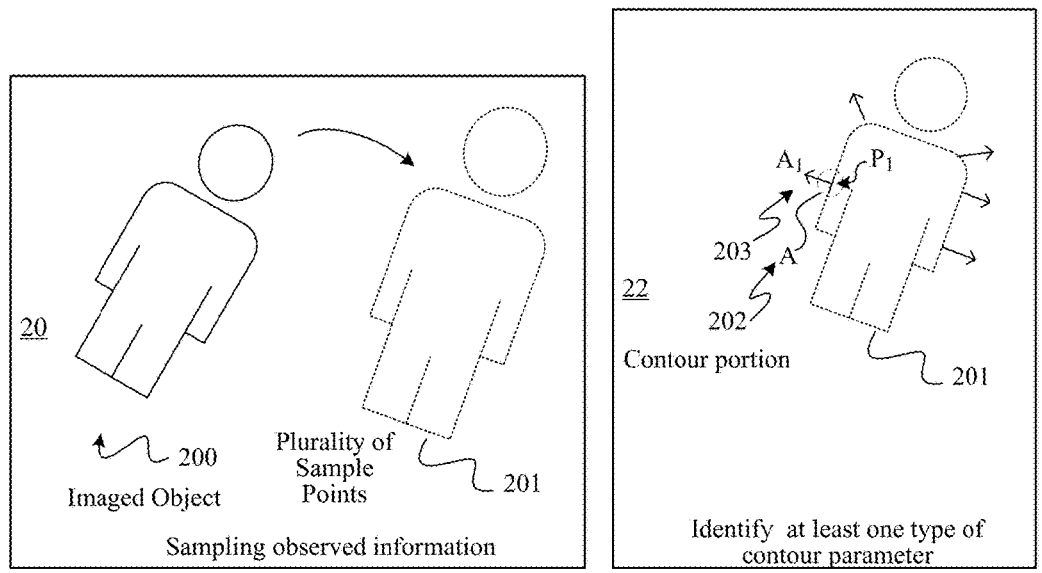
Figure 3D:
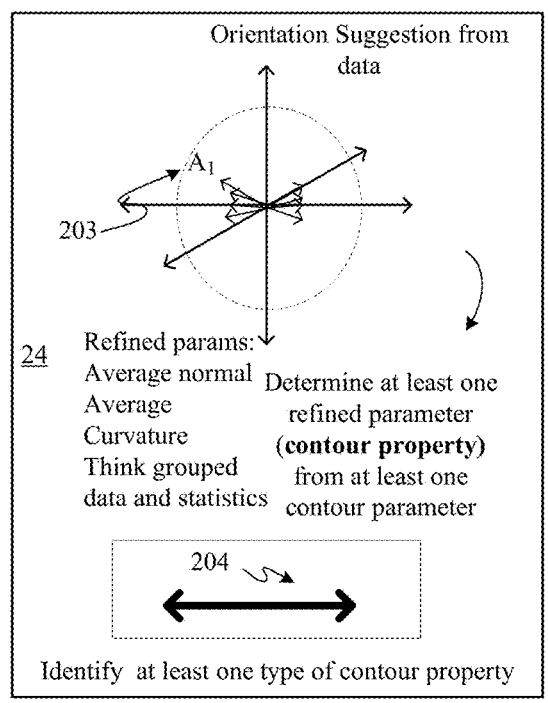
Figure 3E:
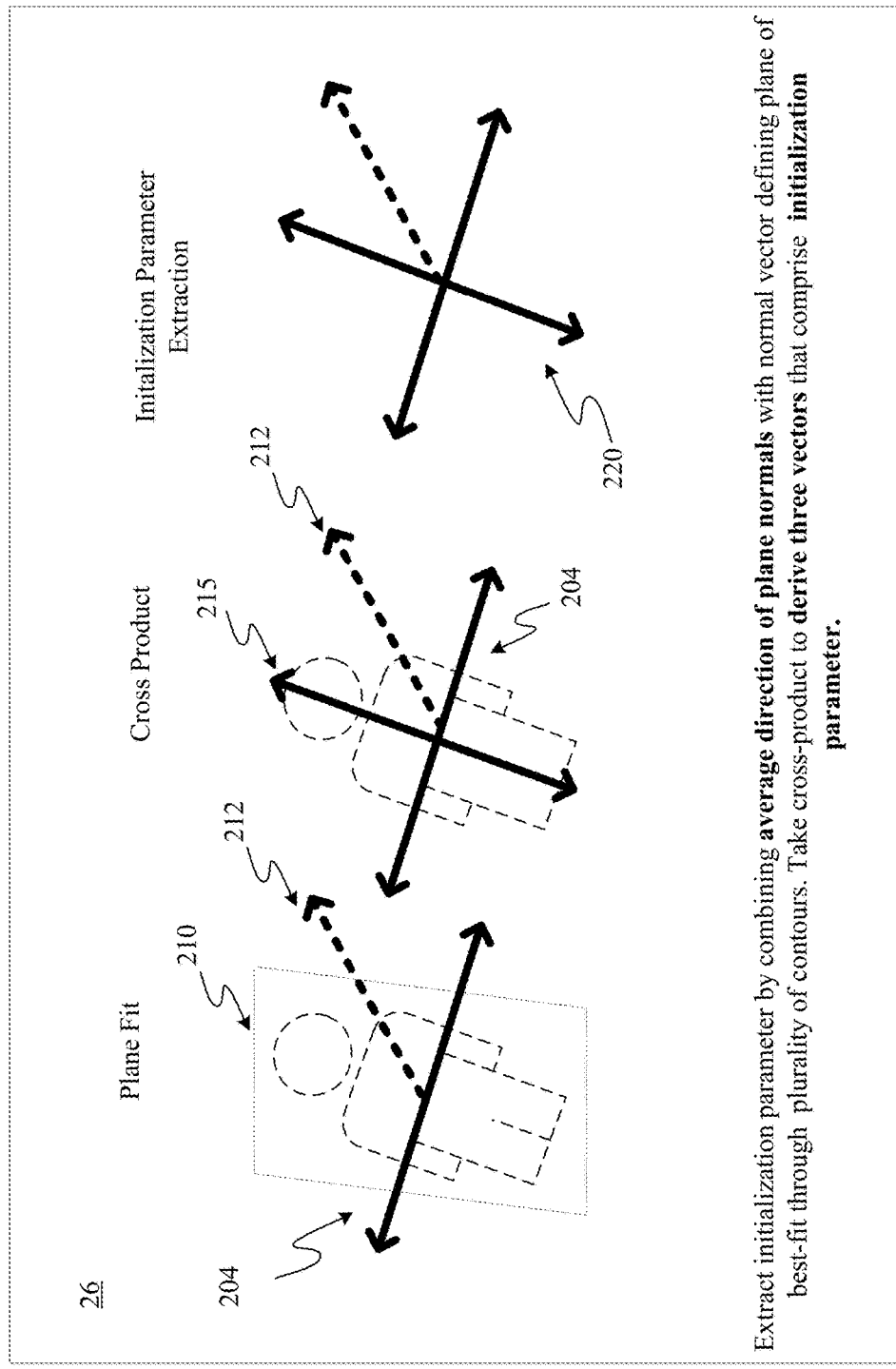
Figure 3F:
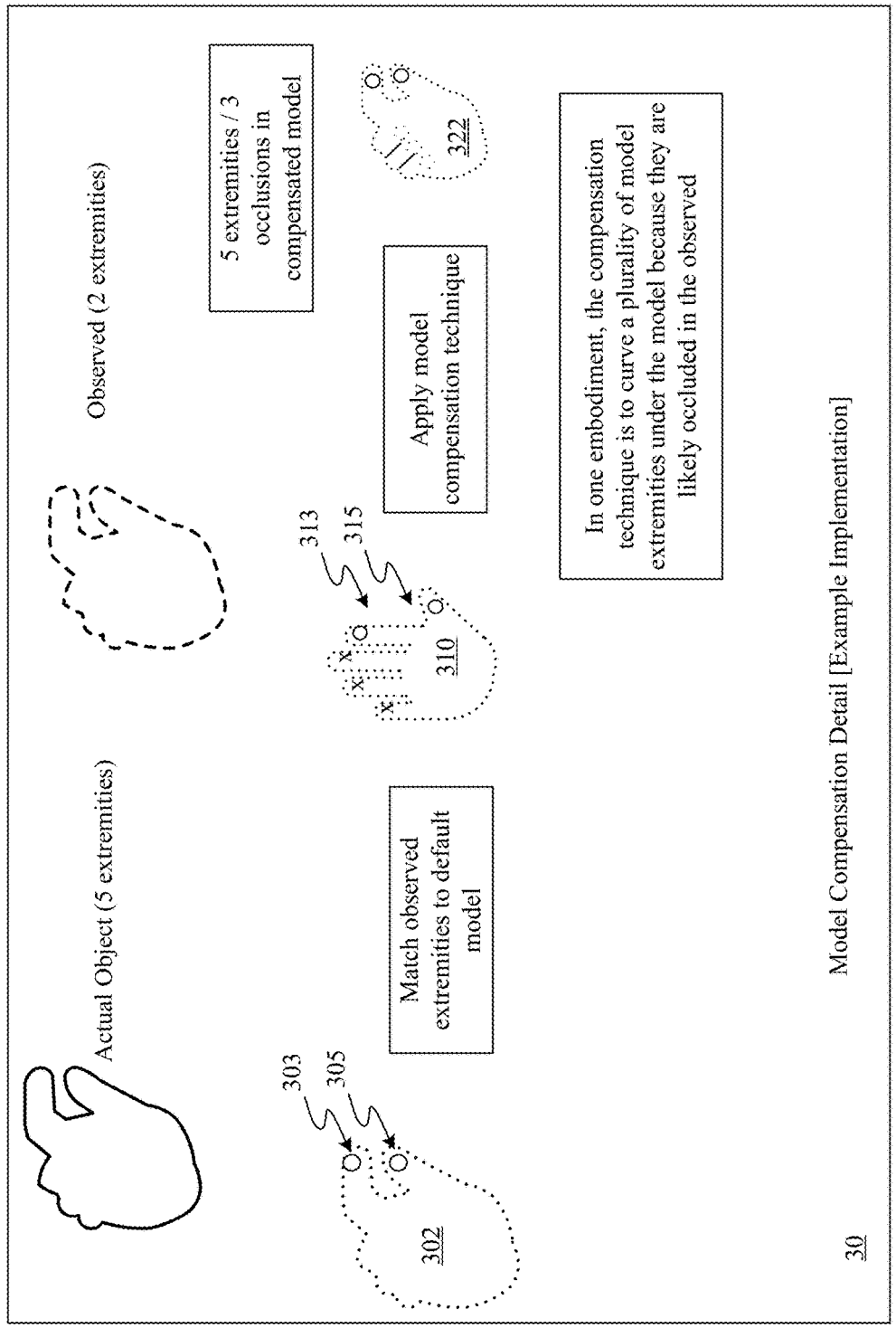

In one implementation, initialization includes orienting a model by an appropriate initialization parameter. Now with reference to FIG. 3D, FIG. 3D illustrates one or more contours that are extracted from a surface portion as represented in the observed information. As illustrated by block 20 of FIG. 3D, a surface portion of an imaged object 200 (e.g., image of real object(s), computer generated input, or combinations thereof) within the observed information can comprise a plurality of surfaces that can be sampled to provide points on observed surface portion 201, from which one or more contours 202 can be extracted.

One method of determining a contour portion is illustrated by block 22 of FIG. 3D, in which the observed information can be sampled to determine a set of points. In some implementations, the observed information can comprise an image or images of the imaged object 200 to be sampled. In other implementations, the observed information comprises instead of, a set of points or a set of contours determined from an imaged object 200. From a set of points 201, one or more contours 202 can be determined using any of a variety of techniques, such as for example determining a gradient for points determined from the imaged object. When a relatively larger value of the gradient is determined, points along the relatively larger value of the gradient can comprise a contour. As shown by block 22 of FIG. 3D, a contour portion A of the one or more contours 202 can be determined from a plurality of points on observed surface portion 201 of block 20.

Now again with reference to FIG. 3D, one or more contour parameters are identified for at least one extracted contour. As shown by block 22 of FIG. 3D, a contour parameter comprising normal A1 203 can be determined from contour portion A of the one or more contours 202. A first (arbitrary) point P1 on a contour portion representing a surface portion of interest in the observed information is selected as a starting point. A normal is identified at the point P1. One method of determining a normal is illustrated by block 22 of FIG. 3D, in which a set of points proximate to the first point P1, at least two of which are not co-linear, is determined. Then a normal for the first unmatched point can be determined using the other points in the set by determining a normal perpendicular to the plane. For example, given points P1, P2, P3, the normal n is given by the cross product:

$$n=(p_2-p_1)\times(p_3-p_1)$$

Another technique can be to: (i) start with the set of points; (ii) form a first vector from P2–P1; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

In implementations, other instances of the contour parameter, i.e., other normal(s), can be determined for other contour portions determined from the sample points on observed surface portion 201 corresponding to the imaged object 200. Furthermore, instances of different types of contour parameters, e.g., center(s) of mass, (e.g., a weighted average of the points within a set), a curvature(s), and so forth, can be determined for the contour portions determined from the sample points on observed surface portion 201 corresponding to the imaged object 200.

A check is made to determine whether there are any further parameters to process. If there are further parameters to process, then the flow continues to process the next parameter. Otherwise, at least one contour property is determined for the various contour parameters. One way to determine a contour property is illustrated by block 24 of FIG. 3D in which one or more contour parameters (e.g., normal A1 203) are combined to produce a contour property 204 by applying a function. For example, one or more contour parameters (e.g., normal A1 203) can be combined to form an average normal contour property 204. A function appropriate to the implementation is applied to the contour parameters to provide grouping of information from the contour parameters into a contour property. For example, in block 24 of FIG. 3D, the average function can be applied to the set of normal(s) determined in block 22 to create an average normal contour property 204. Of course, in implementations, other functions (mean, mode, variance, interpolation, and so forth and/or combinations thereof depending upon the implementation specific requirements or desirability) can be applied to the contour parameters to arrive at a contour property. The result of applying the function to the one or more contour parameters is provided as the contour property 204.

An initialization parameter is determined based at least in part upon the at least one contour property determined above. An initialization parameter can be determined in a variety of ways, such as using one technique illustrated with reference to block 26 of FIG. 3E, in which a plane 210 (FIG. 3E) of best fit is determined through contours in the observed information. A number of techniques are available for determining a plane of best fit illustrated with reference to block 26 of FIG. 3E, one example being multi-linear regression. A third vector 215 is determined by combining a contour property 204 (e.g., average direction of plane normal vectors) with a normal vector 212 defining the plane 210 to derive a third vector 215. One technique employs a cross product to combine contour property 204 with normal vector 212; however other techniques can be used in some implementations.

An initialization parameter 220 determined from the three vectors is provided to the system to initialize orientation of the model. For example, again with reference to block 26 of FIG. 3E, normal vector 212, contour property 204, and third vector 215 can be provided as the initialization parameter 220. In an implementation, the procedure completes and returns a set of vectors as an initialization parameter. In an alternative implementation, a least one of the third vectors (215 in block 26 of FIG. 3E) can be returned as the initialization parameter 220.

Orientation of the model portion is initialized by applying the initialization parameter to at least a portion of a model within the predictive information. Application of the initialization parameter can be used to initialize orientation of the model portion using a variety of techniques—aligning, weighting, specifying (or computing) confidence factors, selecting model portions, and mode selection (child's hand, cat's paw, tool tip, and so forth). For example, one or more portions of a model in the predictive information can be aligned using the initialization parameter 220 as an initial alignment in which a portion(s) of the object is placed to produce an initialized model. In implementations, aligning can include rotational alignment of the model along one or more axes to correspond to the initialization parameter. In other implementations, the rotational alignment can be applied to portion(s) of the model according to a function F, that determines, based at least in part upon the initialization parameter, that a model portion is too far removed from alignment in one or more directions for example to be used. Function F can exclude (or alter the weighting or confidence factor) for that portion in the model based at least in part upon the initialization parameter. In yet further implementations, the model can be aligned according to the initialization parameter and one or more quantifiable characteristics determined from imaging the object (i.e., brightness, frequencies, and so forth). In a further implementation, a model portion can be selected based at least in part upon a degree to which the model portion(s) align to the initialization parameter. For example, an initialization parameter can be used to select from models for adult hands, children's hands, animal paws, tool tips, and so forth based upon alignment. In yet further implementations, initialization parameters can be used to communicate control information to the sensory device, for example, changing power consumption profiles based on quality of alignment of observed object(s), changing frame rates, selecting user modes in software (tool, hand, face discrimination), background elimination, noise elimination.

In some implementations, a compensation can be applied to a model within the observed information. Now with reference to FIG. 3F, one of a variety of techniques for fitting models to observed information in which one or more elements is missing, either due to differences in the object being observed and/or the viewing environment (e.g., noise, occlusions, poor contrast, and so forth) comprises fitting model portion(s) to extremity portion(s) of an observed object and/or fitting model portion(s) to contour segments and properties. One technique for fitting a model are illustrated by block 30 of FIG. 3F which includes determining observed extremities 303, 305 of an object portion(s) 302 in the observed information corresponding to model extremities 313, 315 in a default model 310. A first quality of fit is determined between the observed information and the default model. A model compensation technique is applied to the default model 310 to form a compensated model 322. In one implementation, the compensation technique is to curve a plurality of model extremities under the model because they are likely occluded in the observed information. A second quality of fit is determined between the observed information and the compensated model. A determination is made whether the quality of fit to the compensated model is superior to the quality of fit to the default model. If so, the compensated model is adopted. Otherwise, in the event that the observed information fit the default model better than the compensated model, processing returns to try another compensation technique if available. In some implementations, more than one compensation can be applied to the model to refine the model for various different occlusions, or the like. Other techniques for determining occlusions for the various model portions that can be used in implementations include best fit analysis of the observed against a set of possible compensated models. Further, techniques can be readily created using variations, combinations, or additions of other techniques to the foregoing teachings within the scope of the technology disclosed; see, e.g., U.S. Ser. No. 61/924,193, filed Jan. 6, 2014.

Figure 3G:
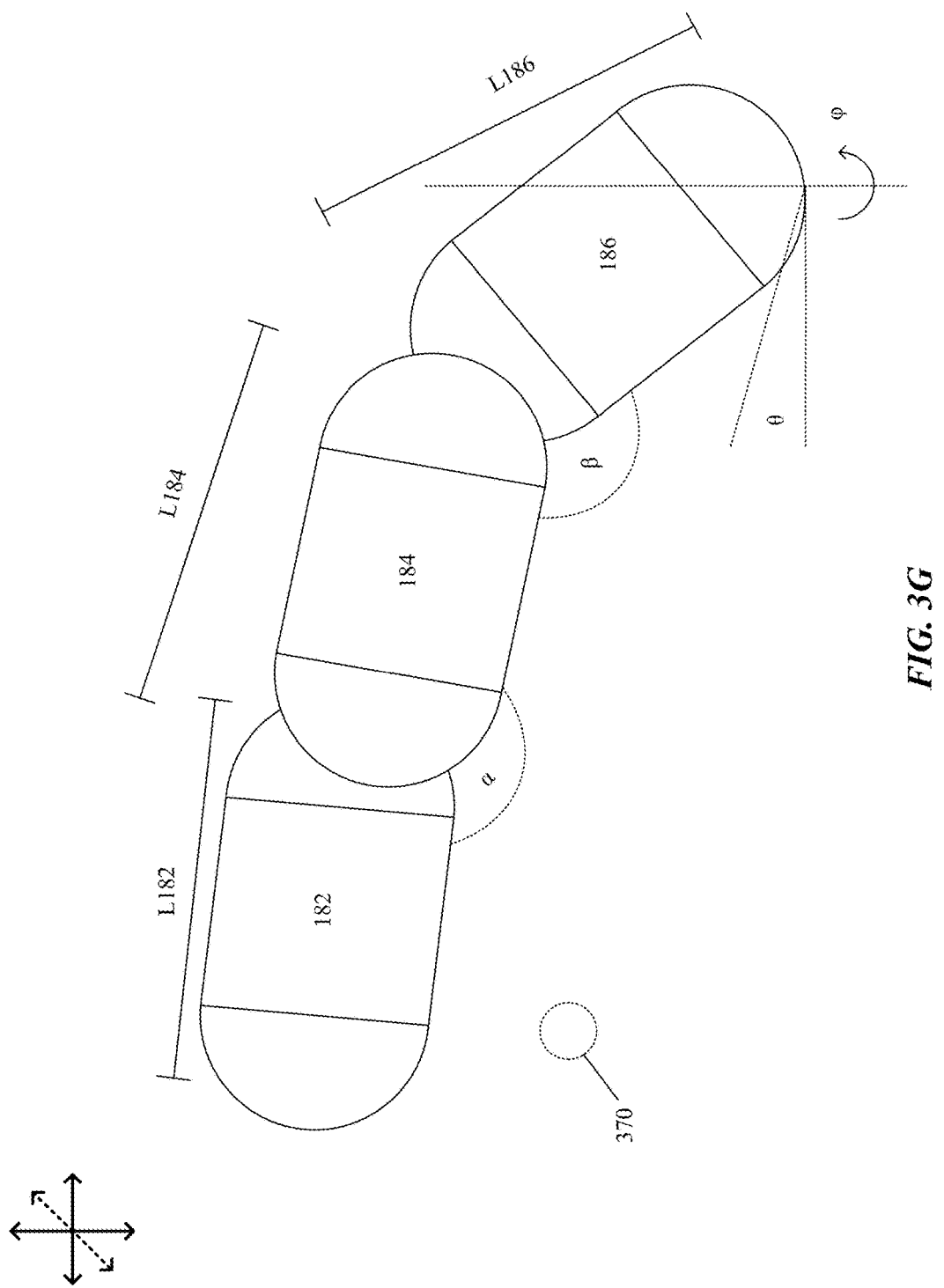
Figure 3H:
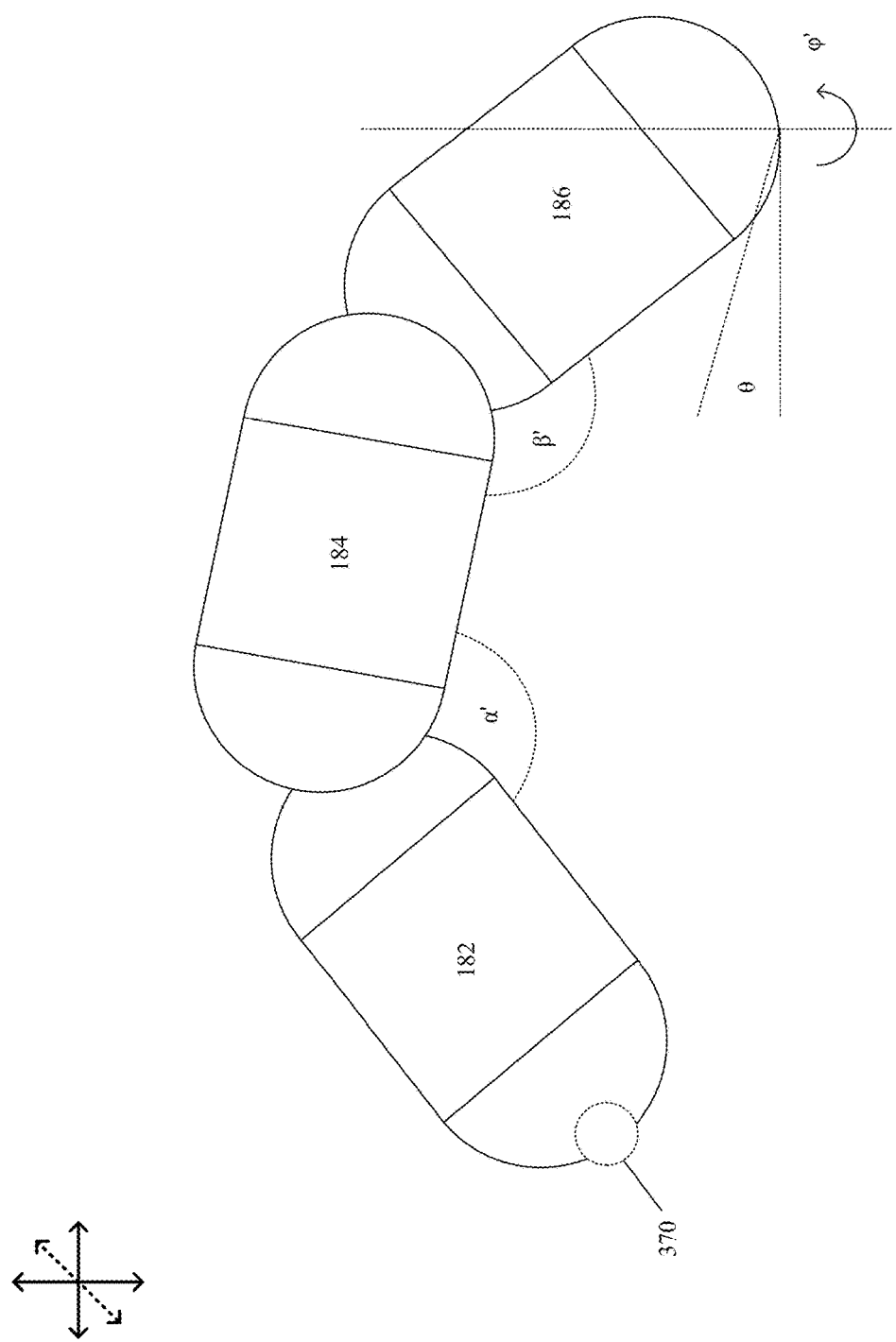

In one implementation, as illustrated by FIGS. 3G and 3H, a fingertip position can be determined from the image and reconstructed in 3D as illustrated. In FIG. 3G, a point 370 is an observed fingertip. Model capsules 182, 184, 186 are aligned such that the tip of capsule 182 is coincident with the location in space of point 370 determined from the observed information. In one technique, angle α and angle β are allowed to be set equal, which enables a closed form solution for θ and φ as well as angle α and angle β.

$$s^2=2ac(-2a^2-2c^2+b^2-2a-2b-2c+4ac)+-2b^2(a^2+c^2)$$

$$\alpha=\beta=\tan^{-1}s-(a+c)b$$

$$\varphi=x_1/\text{norm}(x)$$

$$\theta=x_2/\text{norm}(x)$$

Wherein norm(x) is described as the norm of a 3D point x (370 in FIG. 3G) and a, b and c are capsule lengths L182, L184, L186 in FIG. 3G.

Association

Figure 4:
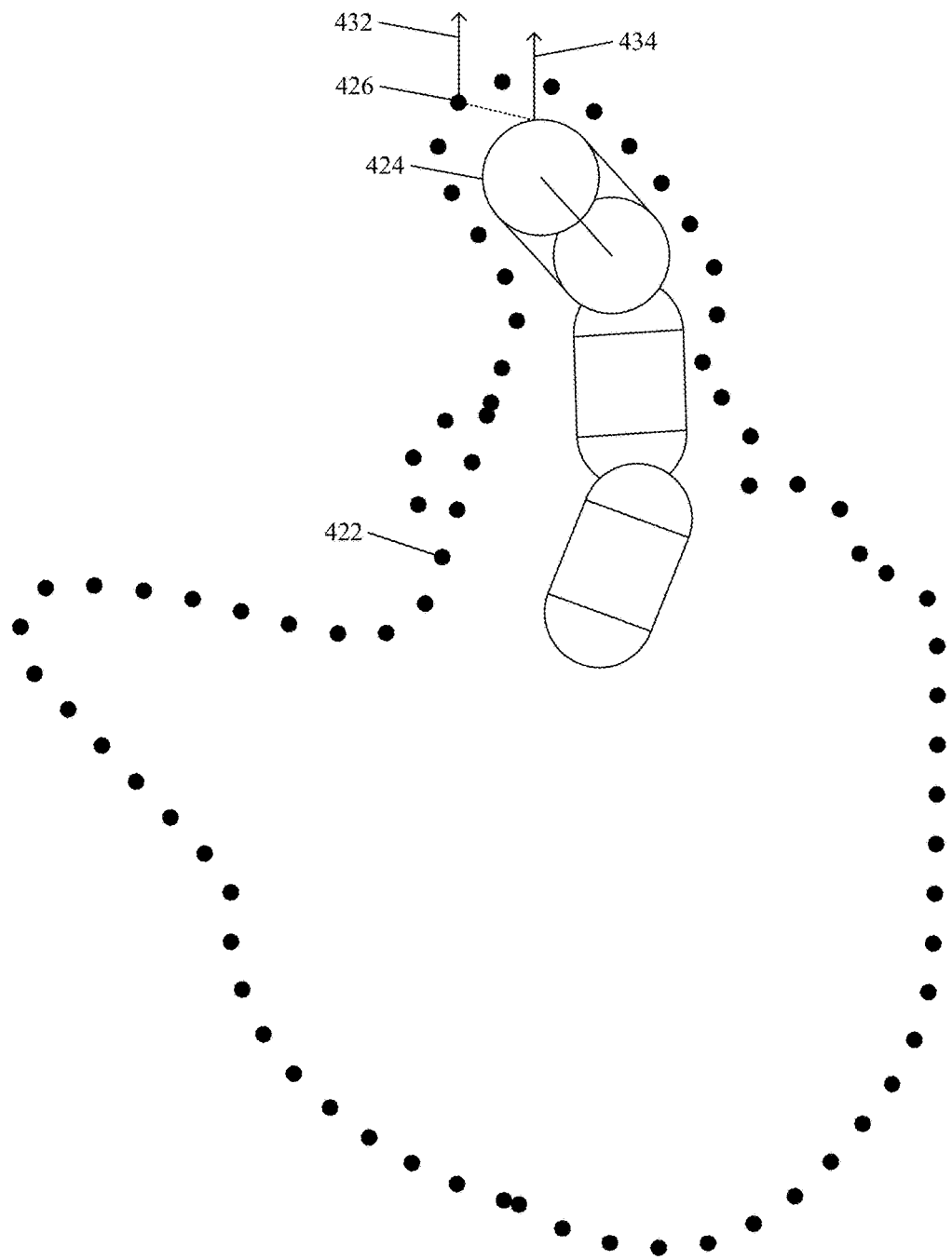
FIG. 4 illustrates one implementation of improving capsule representation of predictive information in accordance with implementations of the technology disclosed.

FIG. 4 illustrates one implementation of improving capsule representation of predictive information. In an implementation, observation information 422 including observation of the control object can be compared against the model at one or more of periodically, randomly or substantially continuously (i.e., in real time). Observational information 422 can include, without limitation, observed values of attributes of the control object corresponding to the attributes of one or more model subcomponents in the predictive information for the control object. In an implementation, comparison of the model 424 with the observation information 422 provides an error indication 426 (also referred to as "variance"). In an implementation, an error indication 426 can be computed by first associating a set A of three dimensional points with a corresponding normal direction 432 to a set B of three dimensional points with a corresponding normal direction 434 on the subcomponents surface. The association is done in a manner that assures that each paired point in set A and B has the same associated normal. An error can then be computed by summing the distances between each point in set A and B. This error is here on referred to as the association error; see, e.g., U.S. Ser. No. 61/873,758, filed Sep. 4, 2013.

Alignment

Predictive information of the model can be aligned to the observed information using any of a variety of techniques. Aligning techniques bring model portions (e.g., capsules, capsuloids, capsoodles) into alignment with the information from the image source (e.g., edge samples, edge rays, interior points, 3D depth maps, and so forth). In one implementation, the model is rigidly aligned to the observed information using iterative closest point (ICP) technique. The model can be non-rigidly aligned to the observed information by sampling techniques.

One ICP implementation includes finding an optimal rotation R and translation T from one set of points A to another set of points B. First each point from A is matched to a point in set B. A mean square error is computed by adding the error of each match:

$$MSE = \mathrm{sqrt}(\Sigma (R^*x_i + T - y_i)^{t*}(R^*x_i + T - y_i))$$

An optimal R and T are computed and applied to the set of points A or B, according to some implementations.

In order to enable the ICP to match points to points on the model, a capsule matching technique is employed. One implementation of the capsule matching includes a class that "grabs" the set of data and computes the closest point on each tracked hand (using information like the normal). Then, the minimum of those closest points is associated to the corresponding hand and saved in a structure called Hand Data. Other points that don't meet a minimal distance threshold are marked as unmatched.

In an implementation, rigid transformations and/or non-rigid transformations can be composed. One example composition implementation includes applying a rigid transformation to predictive information. Then an error indication can be determined, and an error minimization technique such as described herein can be applied. In an implementation, determining a transformation can include calculating a rotation matrix that provides a reduced RMSD (root mean squared deviation) between two paired sets of points. One implementation can include using Kabsch Algorithm to produce a rotation matrix. The Kabsch algorithm is used to find an optimal rotation R and translation T that minimizes the error using the following formula:

$$RMS = \mathrm{sqrt}(\Sigma (R^*xi + T - yi)t^*(R^*xi + T - yi))wi$$

The transformation (both R and T) are applied rigidly to the model. The capsule matching and rigid alignment is repeated until convergence is achieved between model 424 with observation information 422. In one implementation, the Kabsch is extended to ray or covariances by minimizing the error using the following formula:

$$\Sigma (R^*xi + T - yi)t^* Mi^* (R^*xi + T - yi)$$

In the formula above, $M_i$ is a positive definite symmetric matrix. In an implementation and by way of example, one or more force lines can be determined from one or more portions of a virtual surface.

One implementation applies non-rigid alignment to the observed information by sampling the parameters of each finger. A finger is represented by a 3D vector where the entry of each vector is a pitch, yaw and bend of the finger. The Pitch and Yaw can be defined trivially. The bend is the angle between the first and second capsule and the second and third capsule which are set to be equal. The mean of the samples weighted by the RMS is taken to be the new finger parameter, according to one implementation.

After rigid alignment, all data that has not been assigned to a hand, can be used to initialize a new object (hand or tool).

In an implementation, predictive information can include collision information concerning two or more capsuloids. By means of illustration, several possible fits of predicted information to observed information can be removed from consideration based upon a determination that these potential solutions would result in collisions of capsuloids.

In an implementation, a relationship between neighboring capsuloids, each having one or more attributes (e.g., determined minima and/or maxima of intersection angles between capsuloids) can be determined. In an implementation, determining a relationship between a first capsuloid having a first set of attributes and a second capsuloid having a second set of attributes includes detecting and resolving conflicts between first attribute and second attributes. For example, a conflict can include a capsuloid having one type of angle value with a neighbor having a second type of angle value incompatible with the first type of angle value. Attempts to attach a capsuloid with a neighboring capsuloid having attributes such that the combination will exceed what is allowed in the observed—or to pair incompatible angles, lengths, shapes, or other such attributes—can be removed from the predicted information without further consideration.

Correction

In one implementation, given a position, raw image information and fast lookup table can be used to find a look up region that gives constant time of computation of the closest point on the contour. Fingertip positions are used to compute point(s) on the contour which can be then used to determine whether the finger is extended or non-extended. A signed distance function can be used to determine whether points lie outside or inside a hand region. An implementation checks to see if points are inside or outside the hand region.

Abstracting

In one implementation, information can be abstracted from the model. For example, velocities of a portion of a hand (e.g., velocity of one or more fingers, and a relative motion of a portion of the hand), state (e.g., position, an orientation, and a location of a portion of the hand), pose (e.g., whether one or more fingers are extended or non-extended, one or more angles of bend for one or more fingers, a direction to which one or more fingers point, a configuration indicating a pinch, a grab, an outside pinch, and a pointing finger), and whether a tool or object is present in the hand can be abstracted in various implementations.

Clutter Reduction

Figure 5:
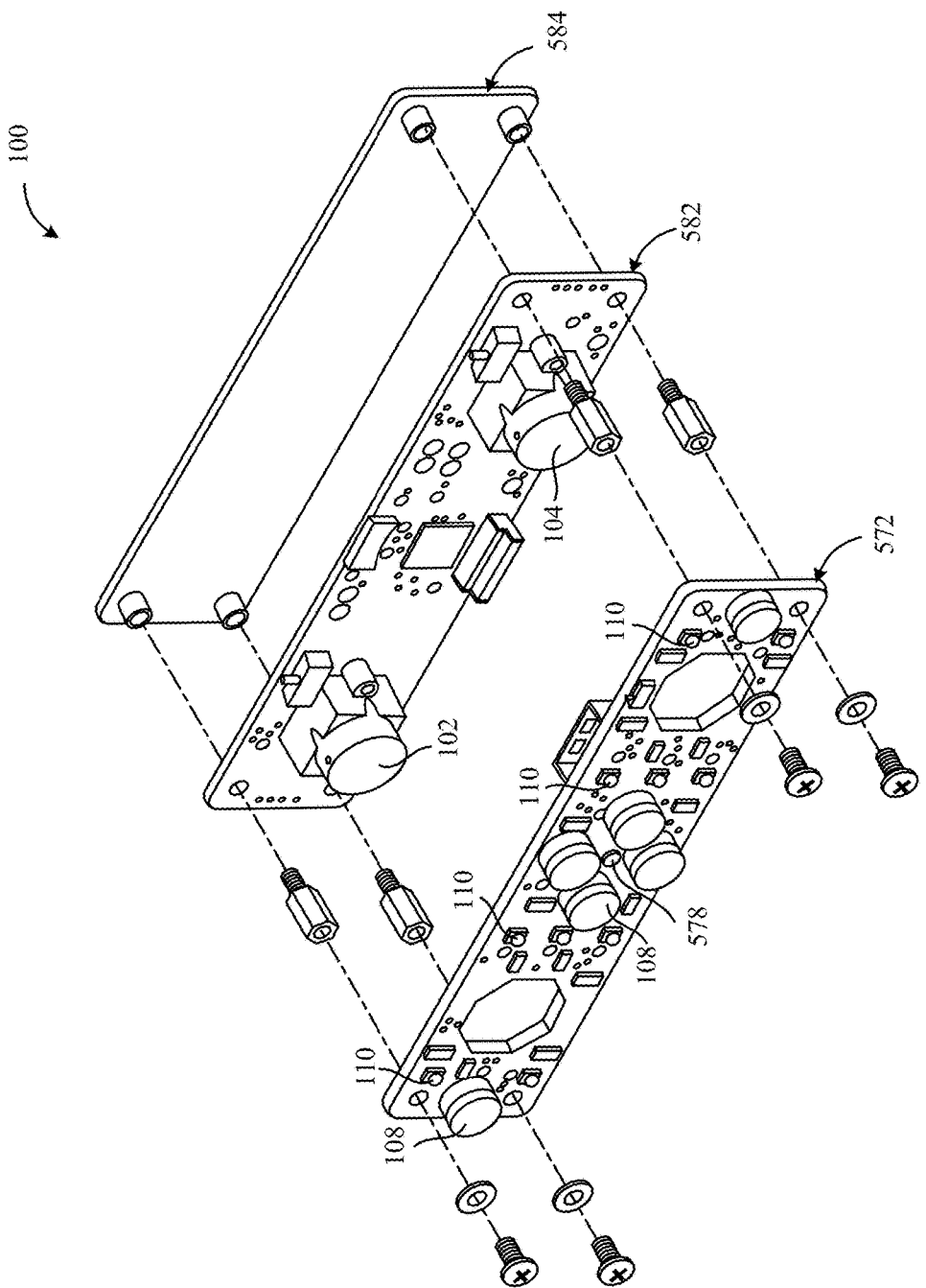
FIG. 5 shows an example motion sensory control device that detects gestures in a three dimensional (3D) sensory space in accordance with implementations of the technology disclosed.

FIG. 5 shows an example motion sensory device 100, which includes an illumination board 572 coupleable to a main board 582 with threaded fasteners or otherwise. Device 100 can be embedded in any of a variety of equipment to meet design requirements of an application. The illumination board 572 has a number of individually controllable illumination sources 108, 110, which can be LEDs, embedded thereon. Some, of the LEDs can have associated focusing optics. In this example, six LEDs comprise illumination sources 108 (four of which are arranged at the center and two of which flank the illumination board 572 at the sides) have focusing lenses, and ten additional LEDs comprise illumination sources 110 (which are arranged in columns of two, three, three, and two LEDs, respectively) are without focusing lenses. The illumination board 572 may also include a socket 578 for coupling a photo-detector (or other sensor). Information from a photo-detector sensing changes in reflectance indicating presence or absence of objects within a region of space into which the illumination sources emit light during a "scanning" of the region of space by the illumination sources, e.g., LEDs. Two cameras 102, 104 provide image-based sensing and reside on the main board 582 of device 100. The main board 582 may also include a processor for basic image processing, control of the cameras 102, 104 and the LEDs of illumination board 572. Various modifications of the design shown in FIG. 1 are possible; for example the number and arrangement of LEDs, photodetectors, and cameras may vary, the scanning and imaging hardware may be integrated on a single board, or both depending upon the requirements of a particular application.

Gestures made by a user and sensed by the cameras 102, 104 of the sensory device 100 are identified and used to determine commands to a system under control from the gestures. The fastening means that fastens the main board 582 (first portion) and the illumination board 572 (second portion) can further fasten these portions to a mounting surface in an automobile interior comprising back plate 584. Alternatively, back plate 584 can be a mounting surface (internal or external) of an appliance or portable electronic device. Advantageously, integrating scanning with imaging capabilities into a single motion sensory device 100 provides a highly functional, flexible, yet compact device suited to installation in machines with limited space, such as, e.g., vehicles, appliances, portable electronic devices, and so forth.

In some implementations, power to illumination sources incorporated with the motion sensory device can be tailored for long distance operation, e.g., illumination sources can be "strobed" (e.g., pulsed) to provide intense bursts of illumination over a shorter period of time, effectively providing greater illumination at reduced power consumption. For example and in one implementation, the device 100 emits light that would normally be emitted by illumination sources 108, 110 over 8 milliseconds (if the full frame time for image capture is considered) and pulses over only 300 microseconds. For this application, the pulse duration t.1 is the length of time the emitted light intensity is above 0.1 (10%) of the peak intensity, unless explicitly specified otherwise. Alternatively, a pulse duration t.5 could be specified, as the length of time the emitted light intensity is above 0.5 (50%) of the peak intensity. This can enable the device to provide approximately 24× greater signal to noise ratio with external light sources. The illumination sources 108, 110 include arrays providing 8× more illumination power than comparable single component LEDs so that power, normally emitted over the 8 ms frame rate, is instead emitted over 40 microseconds. This can enable the device to provide approximately 8× greater signal to noise ratio. In an implementation, the full light power is flashed over the smallest period of time possible. This time period does not affect how bright the hand 114 is (since the LED power is the same), but it affects how bright other light sources appear. The shorter the time period, the dimmer other non-pulsed light sources (like sunlight) will appear.

In an implementation, the device 100 is operated in a low resolution (i.e.: HVGA) mode to provide a frame-rate that is 4× faster than standard resolution, as well as providing low-resolution pixels by combining pixels from the higher resolution operation to achieve around 8× brighter imaging. This can enable the device 100 to provide significantly more dark frames which can accommodate faster movement (4× faster). Further, the brighter pixels enable decreasing the exposure time by an additional 8× to approximately 5 microseconds, which increases the signal to noise ratio by another 8×. In an implementation described below with reference to FIGS. 7A-7C, the device 100 turns the LEDs on and off every other frame and then tries to remove light that exists during the 'dark' frames. In this every other frame mode of operation, in order to offer equivalent resolution the frame-rate is decreased, or in order to offer equivalent frame-rate the resolution is decreased.

In an alternative implementation, illumination sources 108, 110 include 4 LEDs (instead of 16). In this implementation, the device 100 is operated in 4× vertical binning, 2× horizontal binning and the maximum exposure time is reduced by around 8×.

In one implementation, multiple techniques described herein are included, enabling the device 100 when operated in low resolution mode to provide clutter reduction/motion capture in 64× more light with movements 4× faster than previously known techniques.

Image Capture

Figure 6A:
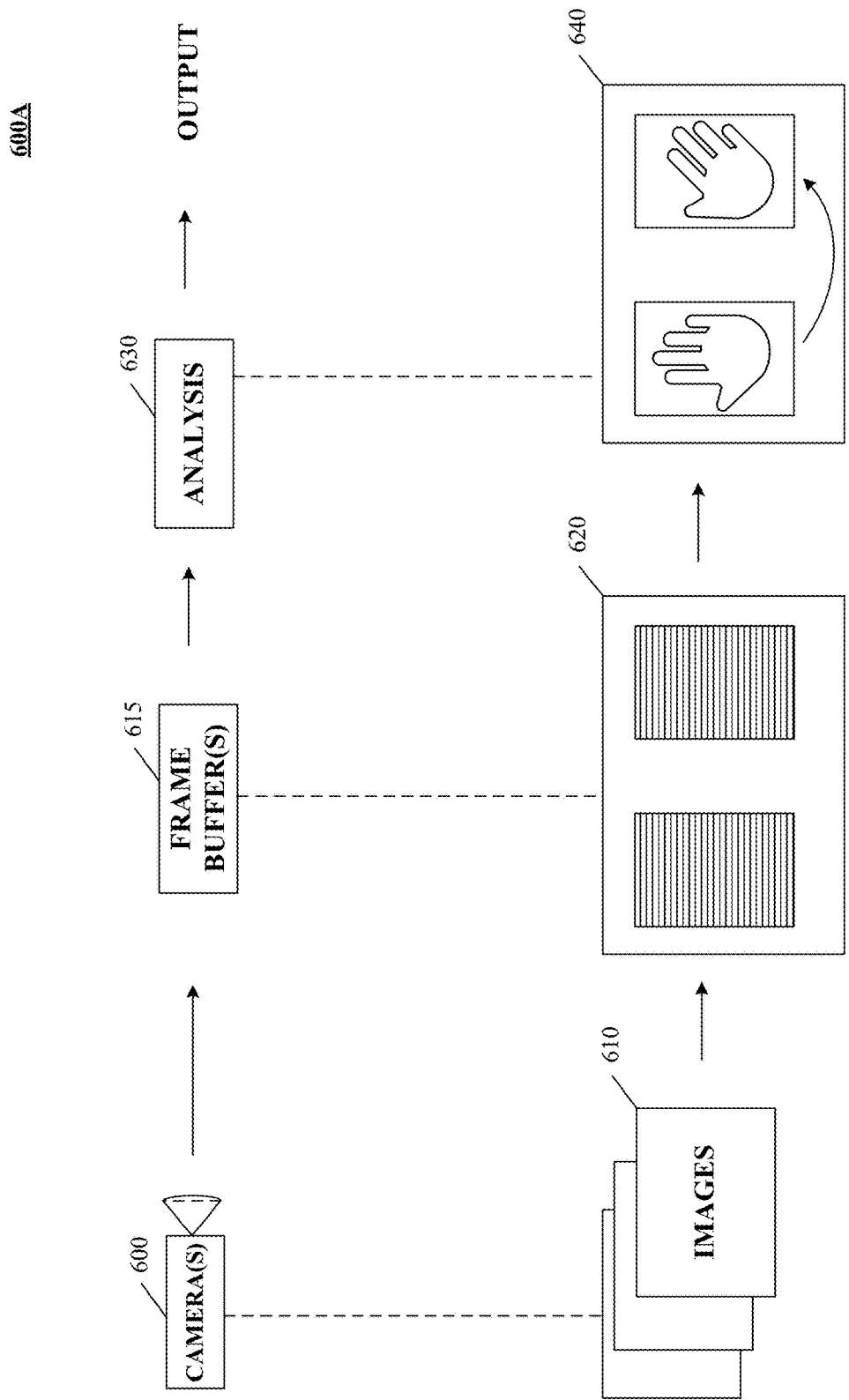
FIGS. 6A and 6B depict the basic operations and functional units involved in motion capture and image analysis in accordance with implementations of the technology disclosed.

FIG. 6A depicts the basic operations and functional units 600A involved in motion capture and image analysis in accordance with implementations of the technology disclosed. As shown in FIG. 6A, the camera(s) 600 record digital images 610 of a scene. Each digital image is captured as an array of pixel values by the associated camera's image sensor, and the digital images are transferred—either in "raw" format or following conventional preprocessing—to one or more frame buffers 615. A frame buffer is a partition or dedicated segment of volatile memory that stores a "bitmapped" image frame 620 corresponding to the pixel values of an image as output by the camera 600 that recorded it. The bitmap is generally organized conceptually as a grid, with each pixel mapped one-to-one or otherwise to output elements of a display. It should be stressed, however, that the topology of how memory cells are physically organized within the frame buffers 615 does not matter and need not conform directly to the conceptual organization.

The number of frame buffers included in a system generally reflects the number of images simultaneously analyzed by the analysis system or module 630, which is described in greater detail below. Briefly, analysis module 630 analyzes the pixel data in each of a sequence of image frames 620 to locate objects therein and track their movement over time (as indicated at 640). This analysis can take various forms, and the algorithm performing the analysis dictates how pixels in the image frames 620 are handled. For example, the algorithm implemented by analysis module 630 can process the pixels of each frame buffer on a line-by-line basis—i.e., each row of the pixel grid is successively analyzed. Other algorithms can analyze pixels in columns, tiled areas, or other organizational formats.

In various implementations, the motion captured in a series of camera images is used to compute a corresponding series of output images for display on the display 138. For example, camera images of a moving hand can be translated into a wire-frame or other graphic depiction of the hand by the processor 132. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 615. A video display controller reads out the frame buffer to generate a data stream and associated control signals to output the images to the display 138. The video display controller can be provided along with the processor 132 and memory 134 onboard the motherboard of the computer 100B, and can be integrated with the processor 132 or implemented as a co-processor that manipulates a separate video memory. As noted, the computer 100B can be equipped with a separate graphics or video card that aids with generating the feed of output images for the display 138. The video card generally includes a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 132 in various ways.

Suitable algorithms for motion-capture program 144 are described below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

Figure 6B:
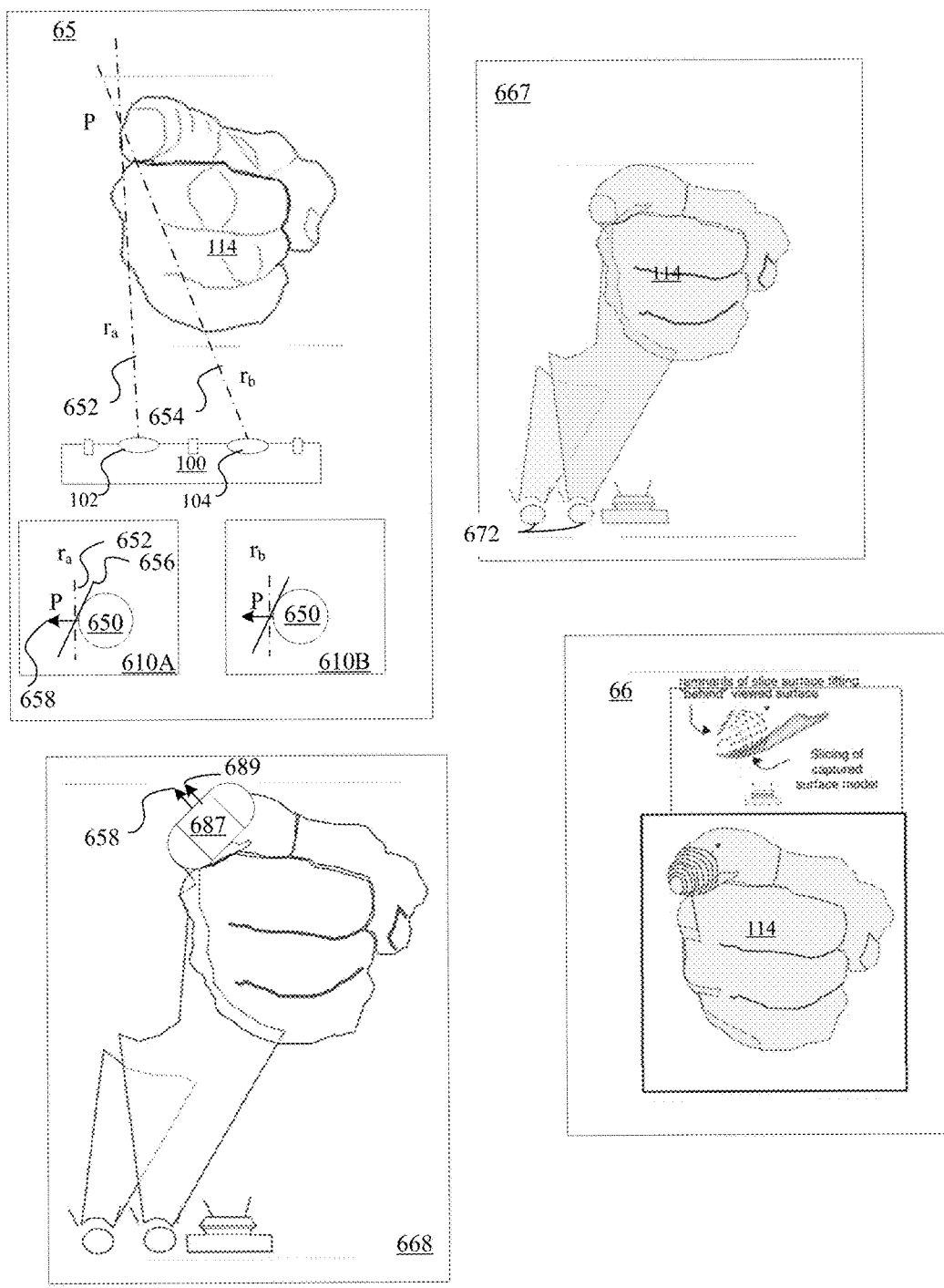

In one implementation 600B, and with reference to block 65 of FIG. 6B, cameras 102, 104 are operated to collect a sequence of images (e.g., 610A, 610B) of the object (e.g., hand 114). The images are time correlated such that an image from camera 102 can be paired with an image from camera 104 that was captured at the same time (or within a few milliseconds). These images are then analyzed by an image-analysis module 630 (in FIG. 6A); in particular, an object-detection routine detects the presence of one or more objects 650 in the image, and the object-analysis routine analyzes detected objects to determine their positions and shape in 3D space. In an implementation shown in block 66, the analysis routine considers a stack of 2D cross-sections through the 3D spatial field of view of the cameras. These cross-sections are referred to herein as "slices." A slice can be any plane at least part of which is in the field of view of cameras 102, 104. For purposes of motion-capture analysis, slices can be selected at regular intervals in the field of view. For example, if the received images include a fixed number of rows of pixels (e.g., 1080 rows), each row can be a slice, or a subset of the rows can be used for faster processing. Where a subset of the rows is used, image data from adjacent rows can be averaged together, e.g., in groups of two or three. In one implementation shown in block 67, one or more sources of emissions can be directed to object (e.g., hand 114) to facilitate collecting observation information.

Again with reference to block 65 in FIG. 6B, one or more rays from the camera(s) can be drawn proximate to an object for some or all of the slices, depending upon the number of vantage points that are available. One or more rays 652 can be determined for some point P on a surface of the body portion 650 of an occupant in an image 610A. A tangent 656 to the body portion surface at the point P can be determined from point P and neighboring points. A normal vector 658 to the body portion surface 650 at the point P is determined from the ray and the tangent by cross product or other analogous technique. In block 68, a model portion (e.g., capsule 687) can be aligned to body portion surface 650 at the point based upon the normal vector 658 and a normal vector 689 of the model portion 687. Optionally, as shown in block 65, a second ray 654 is determined to the point P from a second image 610B captured by a second camera. In some instances, fewer or additional rays or constraints from neighboring capsule placements can create additional complexity or provide further information. Additional information from placing neighboring capsules can be used as constraints to assist in determining a solution for placing the capsule. For example, using one or more parameters from a capsule fit to a slice adjacent to the capsule being placed, e.g., angles of orientation, the system can determine a placement, orientation and shape/size information for the capsule. Slices with too little information to analyze can be discarded or combined with adjacent slices.

In some implementations, each of a number of slices is analyzed separately to determine the size and location of a capsule fitting that slice. This provides an initial 3D model, which can be refined by correlating the cross-sections across different slices. For example, it is expected that an object's surface will have continuity, and discontinuous portions can accordingly be discounted. Further refinement can be obtained by correlating the 3D model with itself across time, e.g., based on expectations related to continuity in motion and deformation.

The modes of operation of the vehicle equipped with a motion sensory control device can determine the coarseness of the data provided to the image-analysis module 630, the coarseness of its analysis, or both in accordance with entries in a performance database. For example, during a wide-area mode of operation, the image-analysis module 630 can operate on every image frame and on all data within a frame, capacity limitations can dictate analysis of a reduced amount of image data per frame (i.e., resolution) or discarding of some frames altogether if the data in each of the frame buffers 610 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 630 (e.g., in defining the contour of an object) are collectively referred to as "image-analysis parameters." The foregoing examples of acquisition parameters and image-analysis parameters are representative only, and not limiting.

Acquisition parameters can be applied to the camera 600 and/or to the frame buffers 610. The camera 600, for example, can be responsive to acquisition parameters in operating the cameras 102, 104 to acquire images at a commanded rate, or can instead limit the number of acquired frames passed (per unit time) to the frame buffers 610. Image-analysis parameters can be applied to the image-analysis module 630 as numerical quantities that affect the operation of the contour-defining algorithm.

The desirable values for acquisition parameters and image-analysis parameters appropriate to a given level of available resources can depend, for example, on the characteristics of the image-analysis module 630, the nature of the application utilizing the mocap output, and design preferences. Whereas some image-processing algorithms can be able to trade off a resolution of contour approximation against input frame resolution over a wide range, other algorithms may not exhibit much tolerance at all requiring, for example, a minimal image resolution below which the algorithm fails altogether.

Figure 7A:
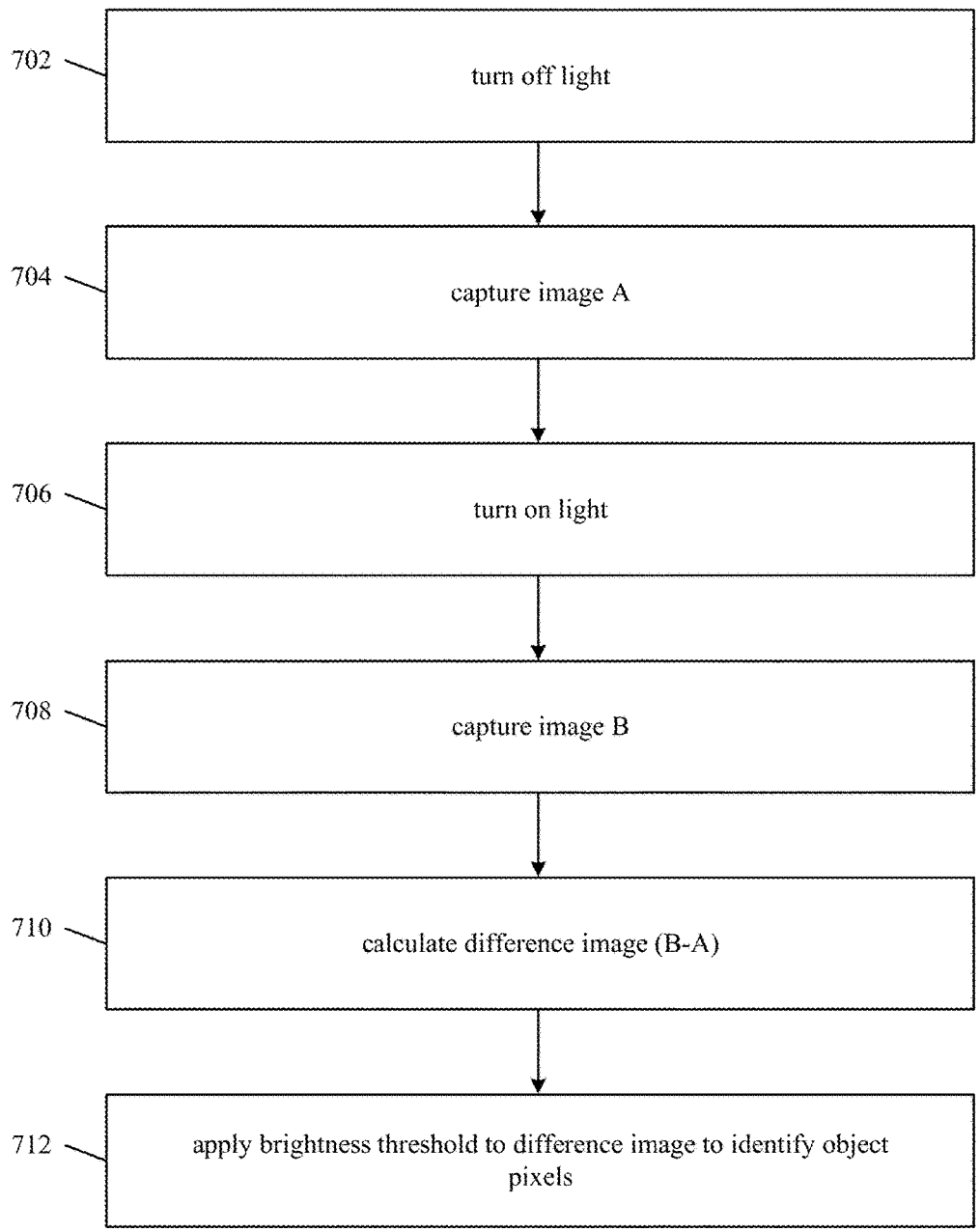
FIGS. 7A, 7B, and 7C show flowcharts of processes for determining operator body portion of interest information using successive images in accordance with implementations of the technology disclosed.
Figure 7B:
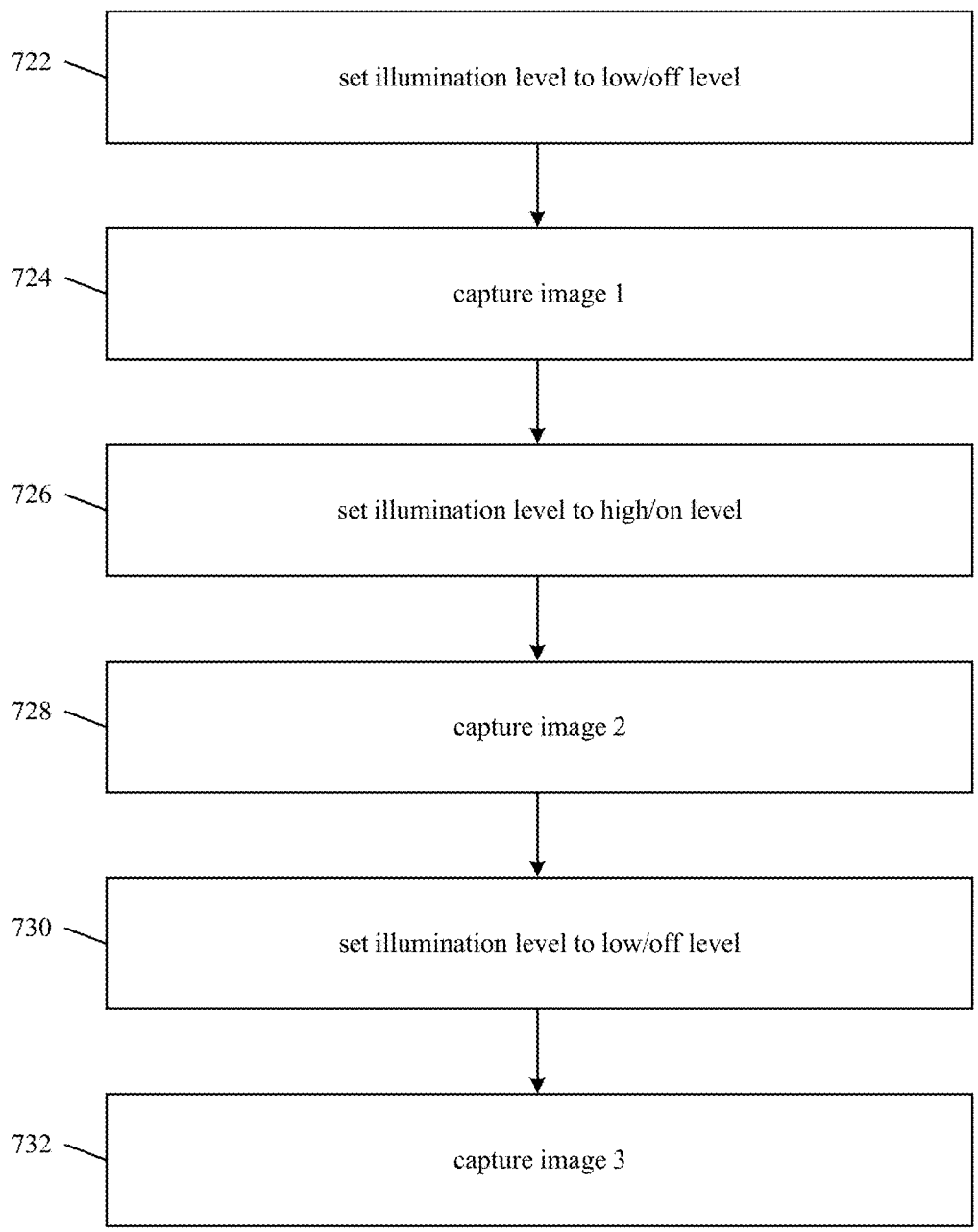
Figure 7C:
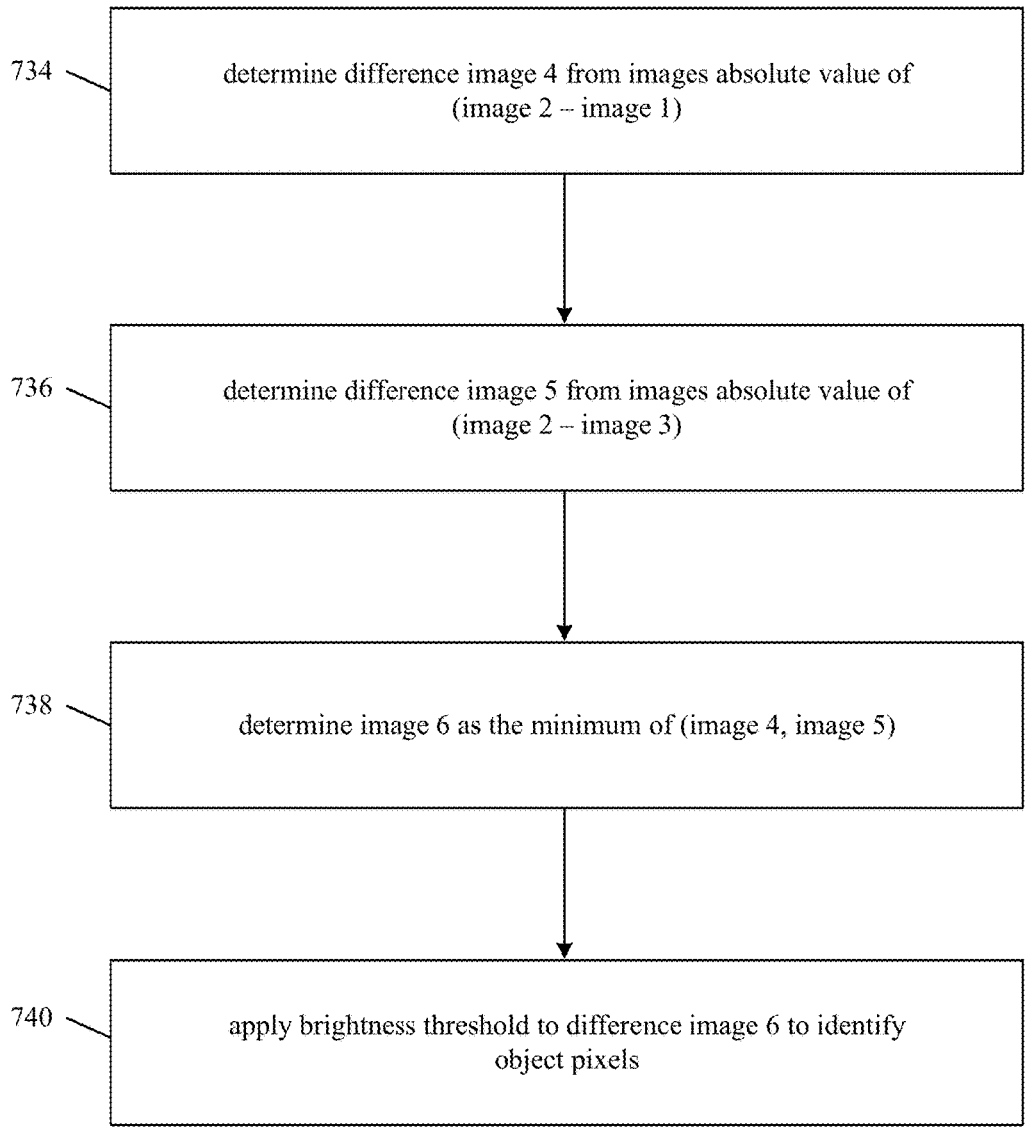

FIGS. 7A-7C show flowcharts 700A-700C of various implementations of determining operator body portion of interest information in an example sensor apparatus. Flowcharts 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIGS. 7A-7C. Multiple actions can be combined in some implementations. For convenience, this flowchart is described with reference to the system that carries out a method. The system is not necessarily part of the method.

FIG. 7A illustrates a flowchart of a process 700A for identifying object edges using successive images according to an implementation of the disclosed technology. In this process, the light sources are turned off (action 702) and a first image (A) is captured (action 704). Then, the light sources are turned on (action 706), and a second image (B) is captured (action 708). A "difference" image B−A is calculated (action 710), e.g., by subtracting the brightness value of each pixel in image A from the brightness value of the corresponding pixel in image B. Since image B was captured with lights on, it is expected that B−A will be positive for most pixels.

The difference image is used to discriminate between background and foreground by applying a threshold or other metric on a pixel-by-pixel basis. A threshold is applied (action 712) to the difference image (B−A) to identify object pixels, with (B−A) above a threshold being associated with object pixels and (B−A) below the threshold being associated with background pixels. Object edges can then be defined by identifying where object pixels are adjacent to background pixels, as described above. Object edges can be used for purposes such as position and/or motion detection, as described above.

In another implementation, as illustrated by FIG. 7B, object edges are identified using a triplet of image frames rather than a pair. For example, in one implementation, light level is set to low level (action 722). A first image (Image1) is captured with the light sources set to low level (action 724). The light level is set to high level (action 726). A second image (Image2) is captured with the light sources set to high level (action 728). The light level is set to low level (action 730). A third image (Image3) is captured with the light sources set to low level (action 732). Now with reference to FIG. 7C, two difference images, Image4=abs(Image2−Image1) and Image5=abs(Image2−Image3)

are then determined by subtracting pixel brightness values (action 734 and action 736). A further image, Image6, is determined based on the two images Image4 and Image5 (action 738). In particular, the value of each pixel in Image6 is the smaller of the two corresponding pixel values in Image4 and Image5. In other words, Image6=min(Image4, Image5) on a pixel-by-pixel basis. Image6 represents an enhanced-accuracy difference image and most of its pixels will be positive. Once again, a threshold or other metric can be used on a pixel-by-pixel basis to distinguish foreground and background pixels (action 740).

Augmented Vehicle Experience

Figure 8:
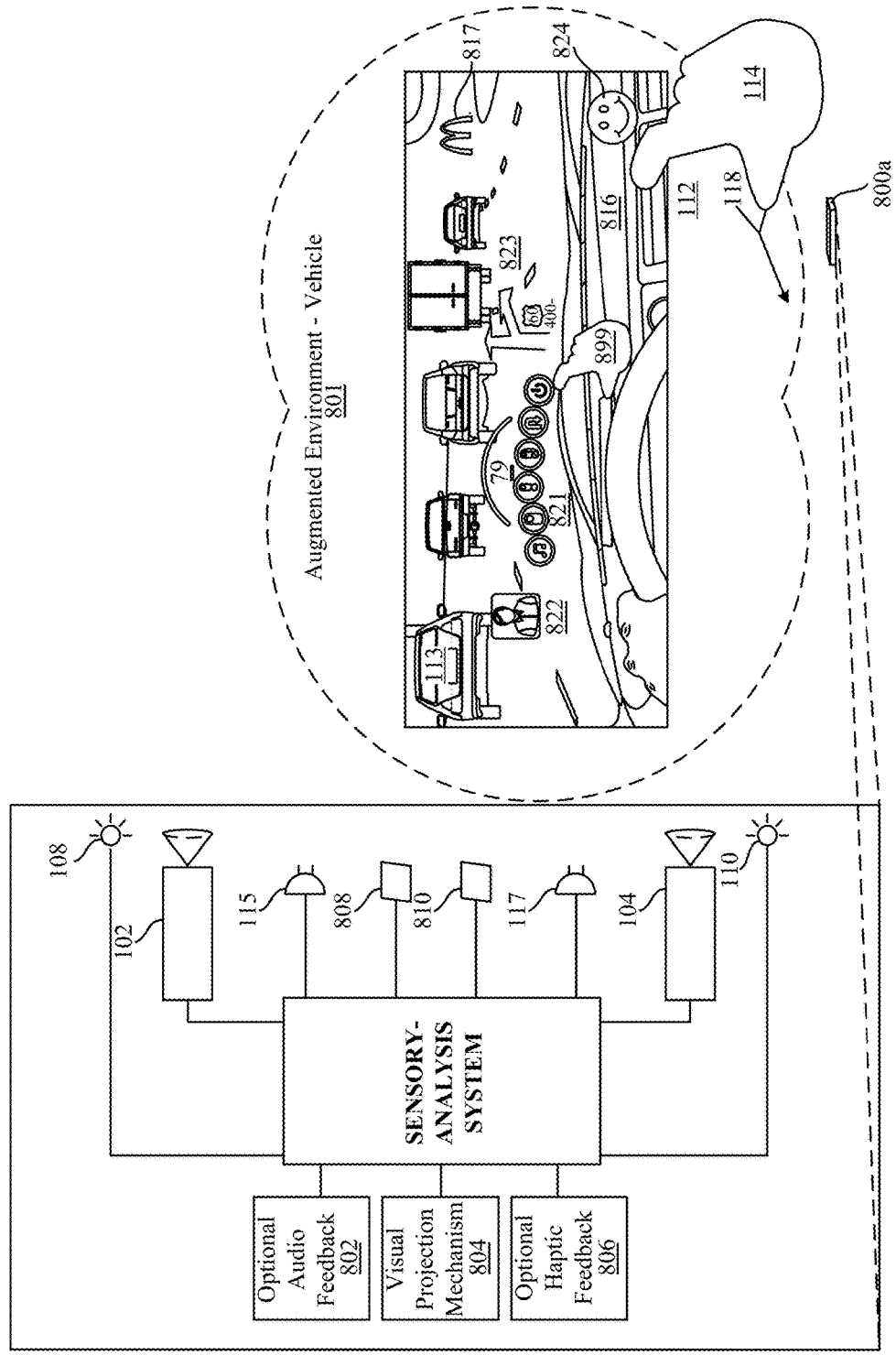
FIG. 8 illustrates an example system for projecting an augmented vehicle environment in accordance with implementations of the technology disclosed.

In one implementation, and with reference to FIG. 8, which illustrates a system 800 for projecting an augmented vehicle environment 801 onto a (semi-) transparent or other surface through which one or more real objects can be viewed also, e.g., a windshield 816 according to one implementation of the technology disclosed. System 800 includes a sensory processing system 106 controlling a variety of sensors and projectors, such as for example one or more cameras 102, 104 (or other image sensors) and optionally some illumination sources 108, 110 comprising an imaging system. Optionally, a plurality of vibrational (or acoustical) sensors 808, 810 positioned for sensing contacts with surface (e.g., a touch screen display or the like not shown in FIG. 8 for clarity sake) can be included. Optionally projectors under control of system 106 can render virtual objects to provide the augmented vehicle environment 801, such as an optional audio projector 802 to provide audio feedback (e.g., "clicks", chimes, speech feedback when virtual buttons are pressed or virtual controls are manipulated), optional video projector 804, an optional haptic projector 806 to provide haptic feedback (e.g., button pressure, pressure indicating a physical object has been grasped, etc.) to a user of augmented vehicle environment 801. For further information on projectors, reference may be had to "Visio-Tactile Projector" YouTube (https://www.youtube.com/watch?v=Bb0hNMxxewg) (accessed Jan. 15, 2014). In operation, sensors and projectors of system 800 can be incorporated wholly or partly into sensor device 800a, or otherwise conveniently disposed toward a region of interest 112 in order to sense motion and presence of hand 114, that moves along the indicated path 118 to give commands to the system 800 by gesturing. One or more applications 822, 823 can be provided as virtual objects integrated into the display of the augmented reality 113. Accordingly, user (e.g., owner of hand 114) is able to view real objects e.g., through windshield 816, outputs of applications 821, 822 virtualized into the augmented reality 113, in the same environment 801.

Projection can include an image or other visual representation of the user's hand 899 and/or one or more optional objects. Objects can include (e.g., objects associated with an application 822, 823, 824 objects representing an operational parameter of the vehicle 821, advertising objects 817, objects representing more abstract things 815, other types of objects, and combination objects). For example, visual projection mechanism 804 of FIG. 8 can project an icon 822 of a person from the operator's contact list. A GPS application can plan route to the selected location for the person in the contact list and provide guidance information 823, also projected as virtualized objects into augmented vehicle environment 801, to the operator. Various objects 821 associated with status monitors provide information about the vehicle's systems. An advertising application searches previous destinations of trips made in close proximity to previous trips to visit contact 822 and displays an appropriate advertising object 817. For example, if the operator visits a friend (contact 822) and they've gone to Burger King the last three times, an advertising icon for McDonalds may appear. A vehicle "happiness" icon 824 displays an overall level of happiness of the occupants determined from a variety of parameters (e.g., frequency of changes in environmental controls, frequency of change in entertainment selections, amounts of ambient light, temperature, humidity, etc.).

Alternatively, surface 816 can be a wearable computing device such as Google Glass™ or equivalent connectable wirelessly or by wire to sensory system 800.

Projections for augmented vehicle environments can be differentiated for front and rear seat passengers in an automobile for example. Front seat passengers can experience clicks, chimes and/or speech feedback responsive to the occupant's gestures. Rear seat passengers can experience clicks, chimes and/or speech feedback on separate audio channel to headphones or HMDs used by the rear seat passengers (to avoid distracting driver).

Alternatively, in a driverless automobile implementation, the "driver" no longer drives vehicle. There is not as significant a price for distracting the "driver". In one such implementation, gestures can be expanded for all front seat passengers to control vehicle (sub) systems. Driverless vehicles can include a larger more interactive HUD (up to whole windshield). Gestures control non-safety related navigation decisions (e.g., override determined routing, waypoints on moving map display, choosing rest stops for purposes of rerouting (e.g., bathroom breaks), and so forth).

Biometrics

In one implementation, a method of authenticating a vehicle operator using the sensory machine control system includes capturing sensory information for a human body portion within a field of interest. A tracking model and biometric model are determined from the sensory information.

A command is determined from recognizing a gesture indicated by variation in the tracking model over time and the biometric model is compared to known users' biometric information. When the biometric model corresponds to biometric information of a known user, an authorized command is communicated to a system controller for the vehicle. Authorized commands enable users to login to the vehicle, specific vehicle systems and/or subsystems, to invoke features/functionality, and/or exchange information.

A biometric model can be determined by analyzing image(s) to determine an image characteristic (e.g., intensity, brightness, color, other characteristics, combinations thereof) and determining a property (e.g., rate of change, maximal, minimal, average or other statistical properties, combinations thereof, and so forth) for the image characteristic. The property can be analyzed to determine changes in the property indicating biometric features corresponding to points of interest in the image. For example, a Hessian can be computed for points in the image, the Hessian indicating how the brightness (or other characteristic) is changing. The biometric features can be transformed based at least in part upon orientation/rotation/translation information to form normalized biometric features. A biometric profile set can be built from one or more identified biometric features; and a biometric model built for an individual from one or more biometric profile set(s).

Additional commands, if any, can be verified by recognizing a second gesture indicated by variation in the tracking model and comparing biometric information of the hand captured during the second gesture with biometric information of the hand captured previously to verify continuity; e.g., determine that the user has not changed. In the event that the biometric information of the hand captured during the second gesture does not correspond to biometric information of the hand captured previously, command information associated with the second gesture can be discarded.

Commands authorization can include determining from profile information stored for the known users, whether an authenticated user having the biometric profile is in a role (e.g., captain, co-pilot, first officer, driver, owner/operator, occupant and so forth) authorized to issue the command determined from tracking the user's hand (or other body) activity. If the user is determined to be authorized to issue the command based at least in part upon the role, the authorized command is communicated to a system being controlled.

Advantageously, some implementations can enable authorized commands to be issued responsive to gesture recognition for use in vehicles or vehicle (sub-) systems based upon authorized use. This capability allows the user to "self-authenticate" while executing intuitive gestures to command a device. Implementations can enable gesture detection, user identification, user authorization, and other machine control and/or machine communications applications in vehicles. In some implementations, "loose biometrics" (e.g., hand size matching, position within the vehicle) can be used for non-security related functions, For example, an automobile recognizes driver/passengers by biometric identifier; sets seat positions, mirrors, steering wheel (or other control) heights, and other parameters (steering stiffness, suspension stiffness, low rider capabilities, favorite radio stations, playlists, pairing correct cell phone, etc.). More "secure biometrics" (e.g., fingerprints, voice prints, vein patterns, hand line patterns or other security based on biometrics) enable the automobile to identify the driver but refuse to start for unauthorized persons.

Operator Disambiguation

Figure 9A:
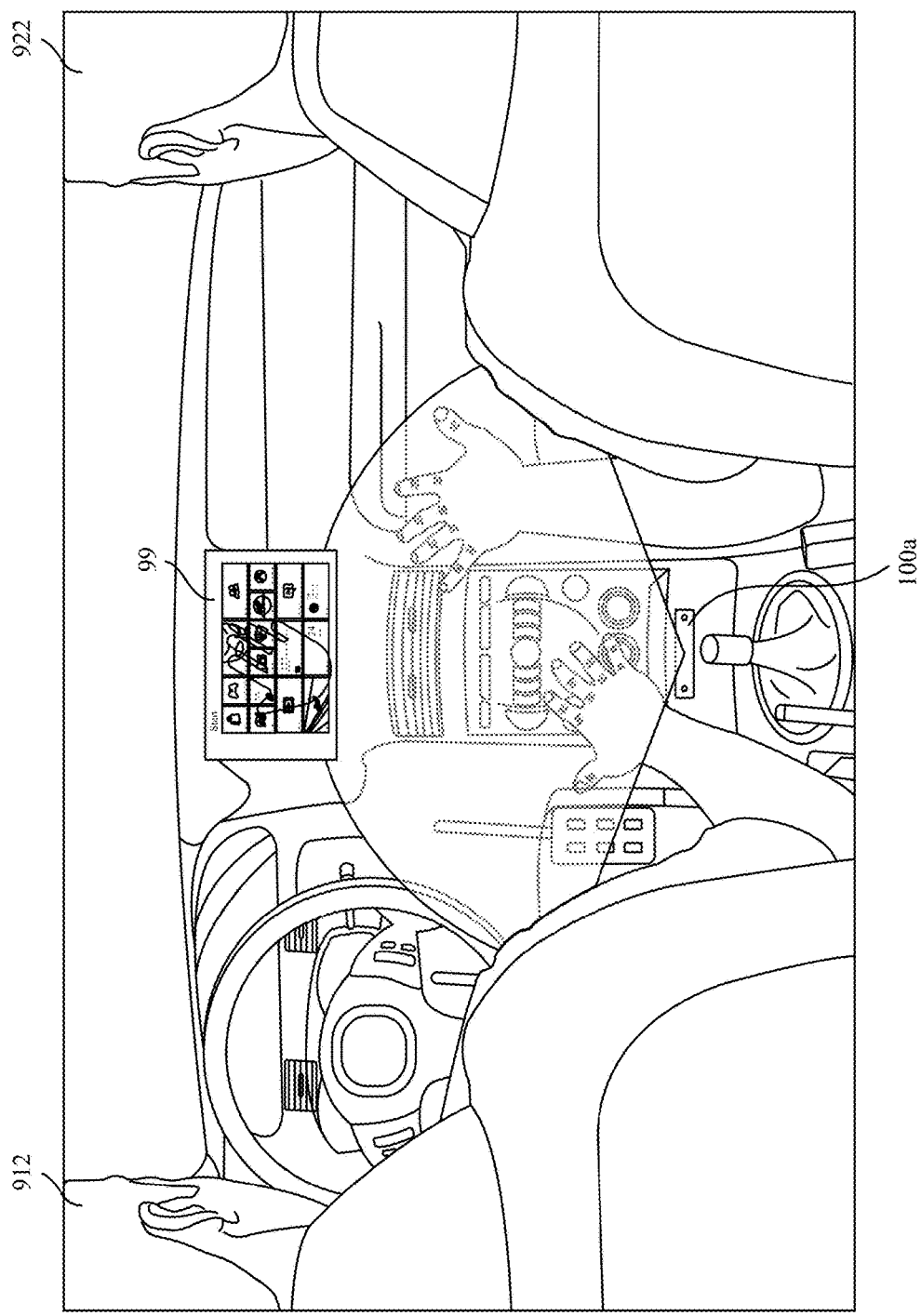
FIGS. 9A, 9B, and 9C show one implementation distinguishing between users issuing gestural commands in a vehicle three dimensional (3D) sensory environment in accordance with implementations of the technology disclosed.
Figure 9B:
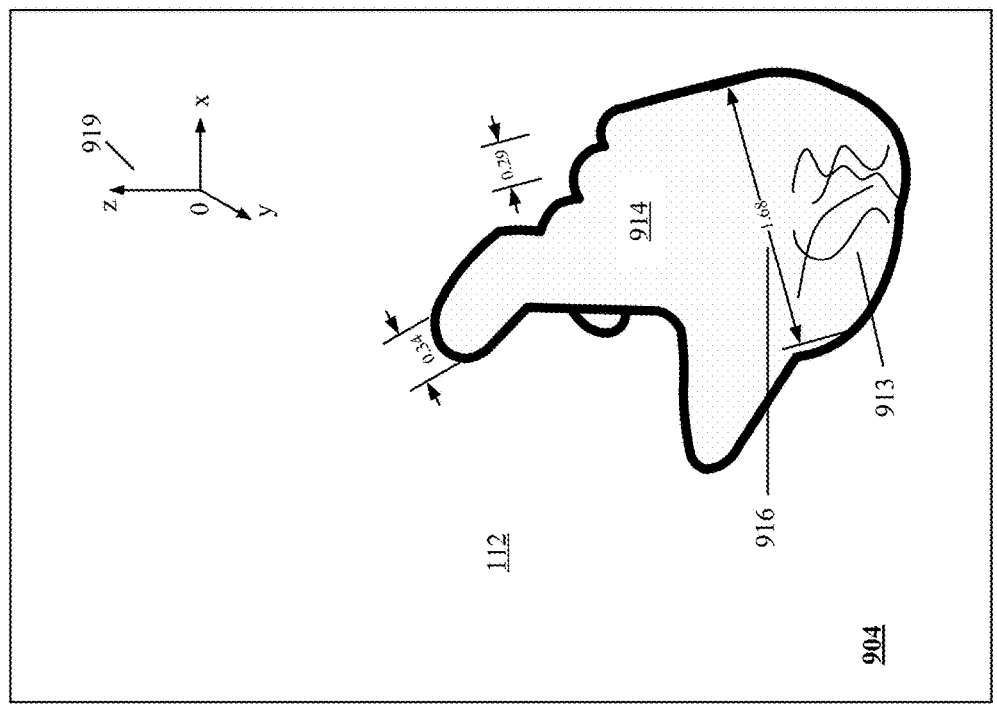
Figure 9B:
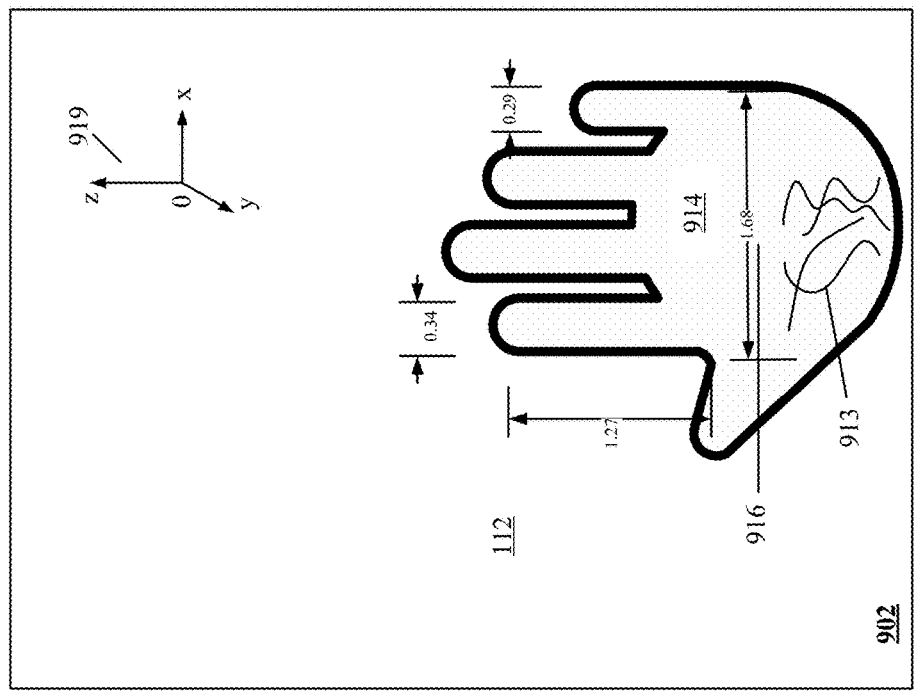
Figure 9C:
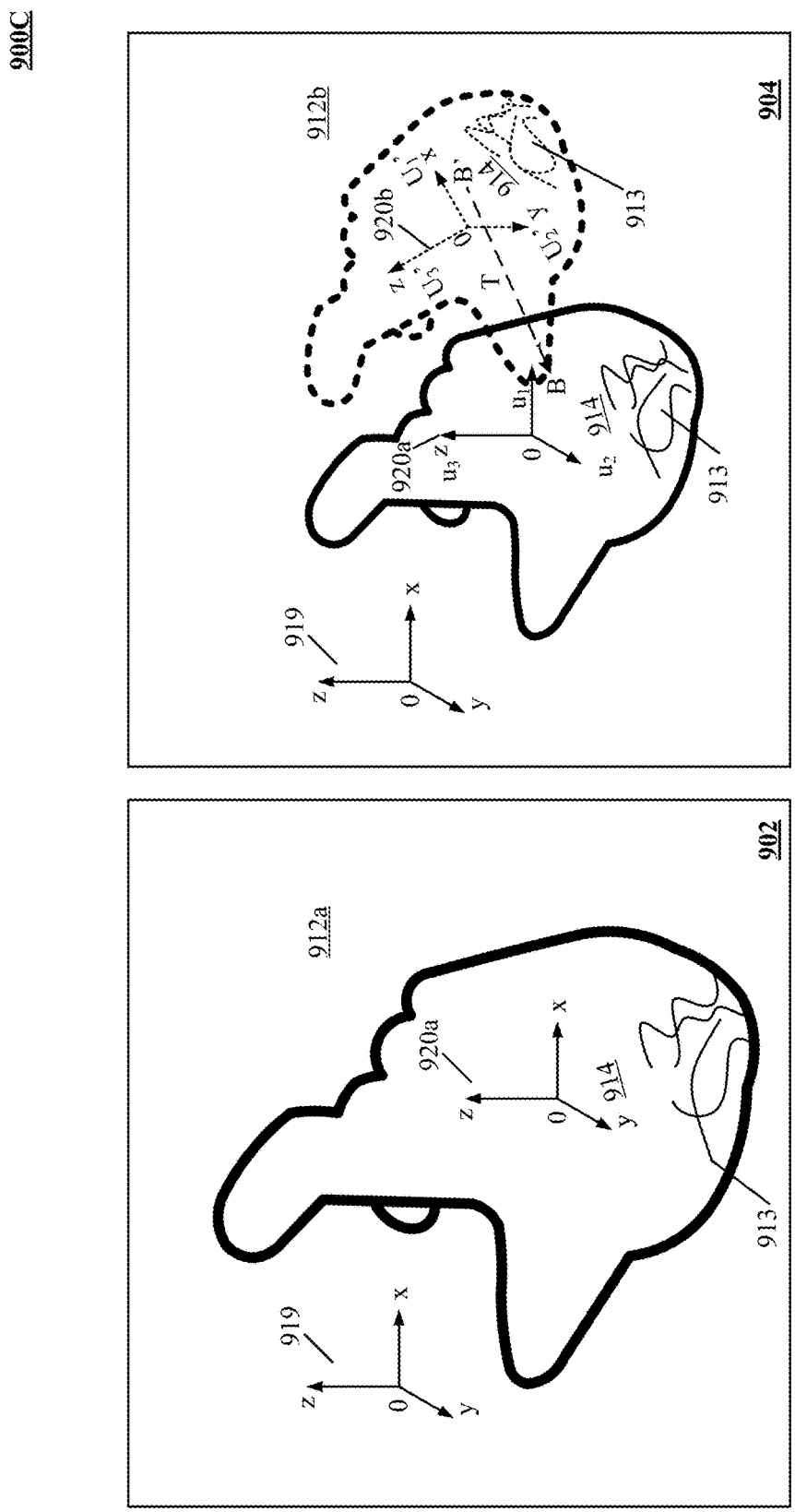

FIGS. 9A, 9B, and 9C show one implementation distinguishing between users issuing gestural commands in a pervasive three dimensional (3D) sensory environment 900A. In one implementation, a dominant user can be identified in the pervasive three dimensional (3D) sensory environment 900A that includes multiple users (912, 922) such that gestures performed by the dominant user are interpreted by the vehicle equipped with motion sensory control device 900 and used to control responsiveness of vehicle. In some implementations, the dominant user can be identified based on spatial behaviors of the users exhibited in the pervasive three dimensional (3D) sensory environment 900A. In one example, certain positions (e.g., driver's seat, cabin right seat, helm, etc.), postures of the users (e.g., pointed fingers, raised hands, high pitched voices) can be indicative of dominant users like speakers or presenter, while others (e.g., folded arms, intermittent voice registries) can be indicative of non-dominant users like listeners or audience members.

FIG. 9B illustrates training a vehicle equipped with a motion sensory control device 100 to recognize a user by biometric features identified from a portion of the user's body and recognizing the user by comparing a biometric profile set built from the user's biometric features with previously recognized biometric features of the user in accordance with the technology disclosed. FIG. 9B shows two views 902, 904 of hand 914 within region of interest 112 of device 100 at two different times, training time $t_0$ (902), and authentication time $t_1$ (904), which can be moments or months apart. Further, views 902, 904 can be at different device 100 instances, (e.g., devices 100a in front seat and device 100c in the rear seat of the vehicle) which can be coupled to share data by a network or the like. In other words, a user might train a first device 100a instance to recognize the user's hand 914 in block 902, and subsequently authenticate at a second device 100c instance in block 904. As shown in block 902, at an initial training time $t_0$, hand 914 is in a particular position and configuration in region of interest 112. Block 902 illustrates a representative pose of a particular user's hand 914 during a learning phase in which biometric features of the hand 914 visible to cameras 102, 104 are identified by system 100 and used to build a biometric model based upon one or more biometric feature(s) of the user hand 914. During training, a user's hand can adopt a variety of poses, e.g., palm facing camera(s), palm facing away from camera(s), and so forth, however only one training pose is shown in block 902 for clarity sake. The user can be prompted to assume various hand poses and at various locations and distances relative to device 100. Device 100 captures one or more images of objects 914 (hands) in a particular pose(s) present within region of interest 112. From images of the hand 914, one or more biometric features (e.g., vein patterns 913, measurements 916 across the palm or at other specific locations, palm prints or patterns, complexion, body temperature indicated by visual cues, other individual specific features and any combination thereof) visible to cameras 102, 104 are identified based upon one or more image characteristics. One or more identified biometric features useful to identify hand 914 comprise a biometric profile set. A biometric model specific to an individual can be built from one or more biometric profile sets, e.g., a first profile set of biometric features for a palm view of the individual's hand, a second profile set of features for a backhand view of the individual's hand, and so forth. Additionally, biometric models can comprise non-visible biometric features determined for an individual using other illumination sources 108, 110 alone, or in conjunction with cameras 102, 104.

Now again with reference to FIG. 9B, in block 904, the user's hand 914 is captured during authentication at authentication time $t_1$. Certain biometric features 913, 916 (vein patterns, palm prints, fingerprints, other features, combinations thereof) can provide useful biometric features for authentication. During authentication, device 100A captures one or more images of hand 914 being authenticated. Characteristics of the image are analyzed with respect to one or more properties to determine biometric features. The biometric features from the hand 914 under authentication are compared with normalized biometric features of one or more biometric profiles built for the user during training in block 902. Biometric features are normalized (e.g., compensated for rotation, translate, and depth) using for example technique(s) like those discussed with reference to FIG. 9C below, since the user's hand 914 is not in the same pose (and may not even be viewed by the same device 100) at authentication time $t_1$ as it was during training time $t_0$. Accordingly, the apparent position of biometric features 913, 916 in the region of interest 112 in block 904 will change from the apparent position of the biometric features 913, 916 in region of interest 112 in block 902. Thus, apparent differences in the biometric features 913, 916 due to the change in position of the hand 914 relative to the device 100, and/or differences in construction between various implementations of device 100, are taken into account by normalizing biometric features during authentication to enable device 100 to identify hand 914 in the pose of block 904 as being the hand 914 trained in the pose of block 902 using a process like that described below with reference to FIG. 9C.

Now with reference to FIG. 9C, which illustrates acquisition of one or more normalized biometric features by the device 100 during training and comparison of biometric features captured from a subject hand being authenticated. During acquiring of biometric features to build a biometric profile set, as shown by block 902, field of view 912a presented to device 100 at training time $t_0$ includes hand 914 which is to be biometrically modeled. At training time $t_0$, the biometric features 913, 916 (e.g., of hand 914) are determined with respect to model reference frame 920a e.g., by processing image data from cameras 102, 104 viewing hand 914. Biometric profile sets comprising one or more biometric features normalized to model reference frame 920a are built from the biometric features. A biometric model of the user can be constructed based upon one or more biometric profile sets.

When comparing biometric features from a captured pose of a hand 914 to be authenticated, as shown by block 904, at authentication time $t_1$, field of view 912b presented by device 100 at authentication time $t_1$ includes hand 914 in a new apparent position. Not only is the hand 914 in a different position when authenticated vs. when taught, it is likely that the hand 914 is authenticated at a different installation of device 100 at a different location when using the device 100 from when characteristics of the hand 914 were originally taught to one of the device 100 installations. Accordingly, the reference frame 920b of the hand as captured during authentication will have moved from an original or starting hand reference frame 920a as described by a transformation $R^T$. It is noteworthy that application of the transformation $R^T$ enables the hand 914 to be compared and/or recognized when rotated as well as translated relative to a taught pose of hand 914. Implementations can provide transforming the position and rotation of reference frame 920b with respect to reference frame 920a and therefore, transforming the position and rotation of tracked subject 913 with respect to 920b, at authentication time $t_1$. Implementations can determine the position and rotation of tracked subject 913 with respect to 920a from the transformed position and rotation of reference frame 920b with respect to reference frame 920a and the transformed position and rotation of tracked subject 913 with respect to 920b.

In an implementation, a transformation $R^T$ is determined that moves captured (dashed) reference frame 920b to model (solid) reference frame 920a. Applying the transformation $R^T$ to any point(s) captured relative to the captured (dashed) reference frame 920b makes the point(s) lie on top of corresponding point(s) relative to model (solid) reference frame 920a. Then the tracked object 914 will be in the right place from the point of view of model (solid) reference frame 920a to facilitate recognition, comparison and so forth. In determining the motion of object 914, image processing system 106 can determine its location and direction by computationally analyzing images captured by cameras 102, 104 and motion information captured by sensors 115, 117. For example, an apparent position of any point on the object (in 3D space) at capture time t=

$$t_1 : \begin{bmatrix} x \\ y \\ z \\ 1 \end{bmatrix},$$

can be converted to a position of the point on the original model object at training time $$t = t_0 : \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}.$$

The correct location at capture time $t=t_1$ of a point on the tracked object with respect to model reference frame 120*a* is given by equation (3):

$$\begin{bmatrix} R_{ref}^T & (R_{ref}^T)*-T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (3)$$

Where:
$R_{ref}$—Represents an affine transform describing the transformation from the hand reference frame 920*b* to the model reference frame 920*a*.
$T_{ref}$—Represents translation of the hand reference frame 920*b* to the model reference frame 920*a*.

Figure 10:
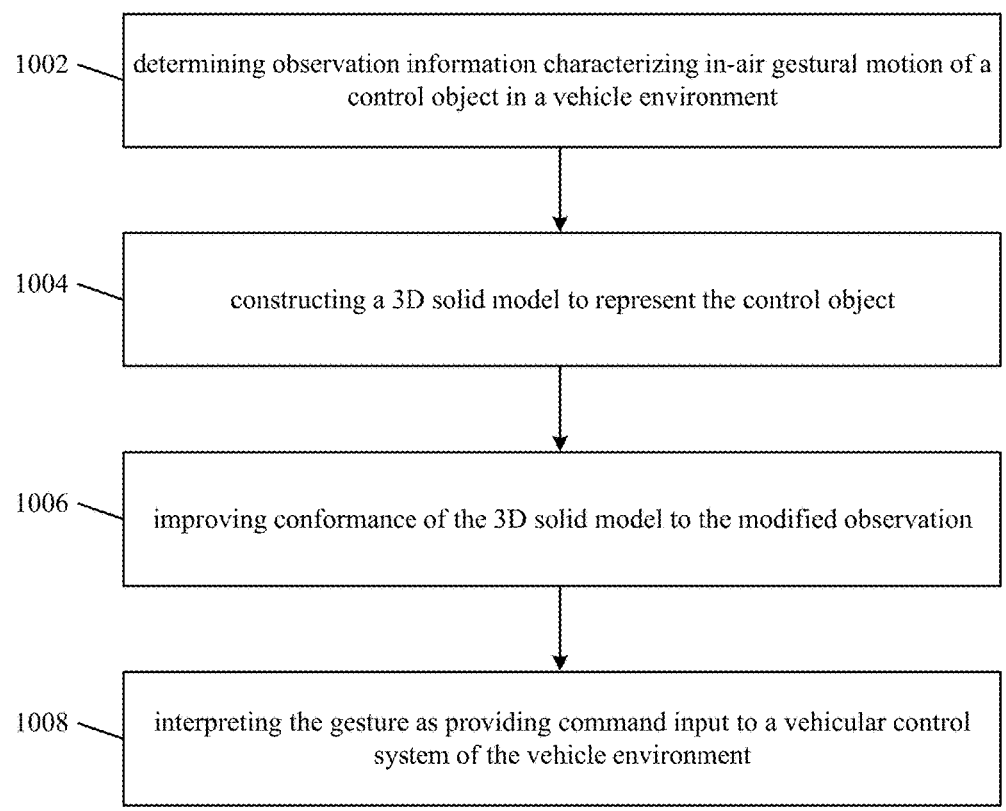
FIG. 10 shows a flowchart of one implementation of recognizing in-air gestures of a control object to control a vehicular control system.

Again with reference to FIG. 9C, block 904 illustrates hand reference frame 920*b*, which can be represented by a 3×3 matrix R'=[$u_1$', $u_2$', $u_3$'] and model frame 920*a*, which can be represented by a 3×3 matrix R=[$u_1$, $u_2$, $u_3$]. The objective is to transform R' (reference frame 920*b*) into R (reference frame 920*a*) so that any point on the hand 914 being authenticated known with reference to frame 920*b* can be compared to a point or points of the hand 914 as taught (i.e., known) with reference to frame 920*a*. Accordingly, an affine transform $R^T_{ref}=R(R')^T$ will achieve this objective. Affine transform $R^T_{ref}$ can be expressed in terms of R and R' as shown by equation (4):

$$R_{ref}^T = \begin{bmatrix} u_1 \cdot u_1' & u_1 \cdot u_2' & u_1 \cdot u_3' \\ u_2 \cdot u_1' & u_2 \cdot u_2' & u_2 \cdot u_3' \\ u_3 \cdot u_1' & u_3 \cdot u_2' & u_3 \cdot u_3' \end{bmatrix} \quad (4)$$

$$T = \begin{bmatrix} a \\ b \\ c \end{bmatrix}$$

is a vector representing a translation of the object with respect to origin of the coordinate system of the translated frame Flowcharts FIG. 10 shows a flowchart 1000 of one implementation of recognizing in-air gestures of a control object to control a vehicular control system. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1002, observation information characterizing in-air gestural motion of a control object is determined from at least one image captured at time t0.

At action 1004, a 3D model is constructed to represent the control object by fitting one or more 3D solid subcomponents to a construct of the control object defined by the observation information based on the image captured at time t0.

At action 1006, conformance of the 3D model to the modified observation information is improved responsive to modifications in the observation information based on another image captured at time t1, wherein the control object moved between t0 and t1. This improvement is achieved by determining an error indication between a point on another construct of the control object defined by the observation information based on the image captured at time t1 and a corresponding point on at least one of the 3D solid subcomponents fitted to the construct defined by the observation information based on the image captured at time t0 and adjusting the 3D model responsive to the error indication.

At action 1008, the motions of the control object determined based at least in part from the adjusting the 3D model are interpreted as one or more gestures providing command input to a vehicular control system.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as in different sections of this application such as capsule hand, initialization, scaling, orientation, association, alignment, correction, abstracting, clutter reduction, image capture, augmented vehicle experience, biometrics, and/or operator disambiguation.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 11:
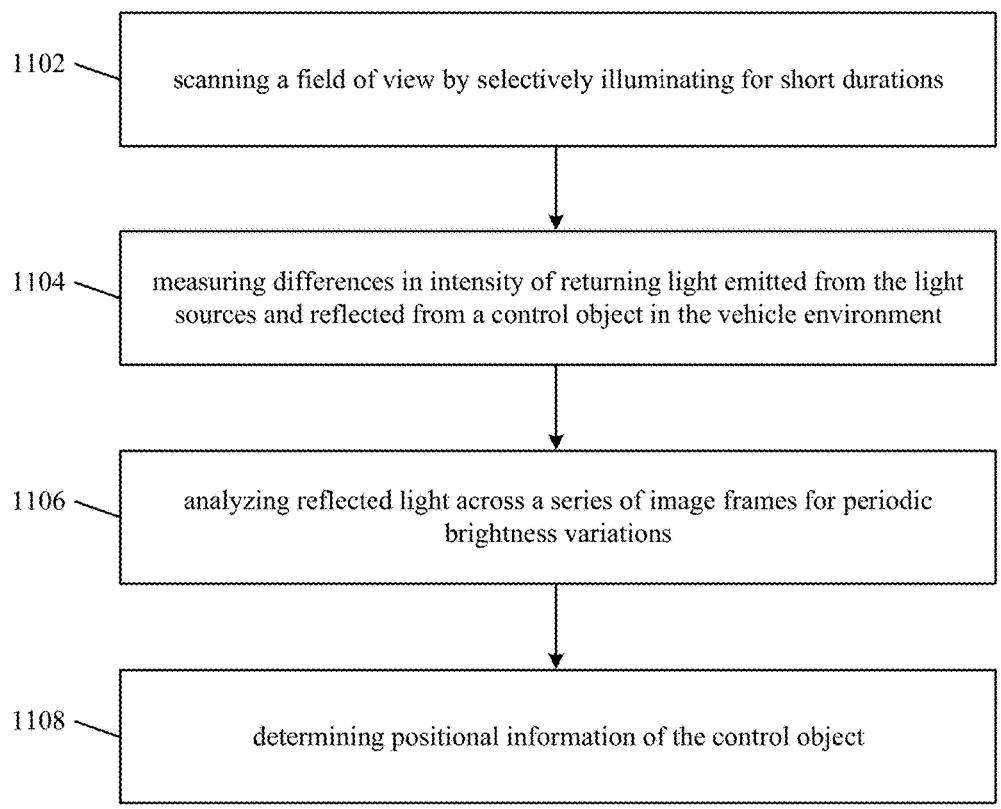
FIG. 11 illustrates a flowchart of a representative method of recognizing speedy in-air gestures of a control object in uncontrolled lighting situations of a vehicle environment.

FIG. 11 illustrates a flowchart of a representative method 1100 of recognizing speedy in-air gestures of a control object in uncontrolled lighting situations of a vehicle environment. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1102, a field of view is scanned by selectively illuminating for short durations respective ones of a predetermined plurality of directionally oriented light sources that have overlapping fields of illumination. In some implementations, selectively illuminating the respective light sources further includes varying brightness of pairs of overlapping light sources by dimming a first, initially on light source while brightening a second, initially off light source.

In some implementations, the short durations are in order of 5 to 40 microseconds. In some implementations, the pre-determined plurality of directionally oriented light sources includes between six to sixteen light sources.

At action 1104, a measurement is made of one or more differences in intensity of returning light emitted from the respective light sources and reflected from a control object in the vehicle environment. In one implementation, a rate of selective illumination of the light sources is determined by measuring one or more frequencies of the periodic brightness variations. In another implementation, the method further includes varying a rate of capture of the series of image frames.

At action 1106, the reflected light is analyzed across a series of image frames for periodic brightness variations. In one implementation, the method further includes capturing the image frames at a low-resolution by analyzing a reduced amount of image data lines per image frame.

At action 1108, positional information of the control object is determined based at least in part upon one or more measured differences in intensity of the returning light.

This method and other implementations of the technology disclosed can include one or more of the following features and/or features described in connection with additional methods disclosed.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 12:
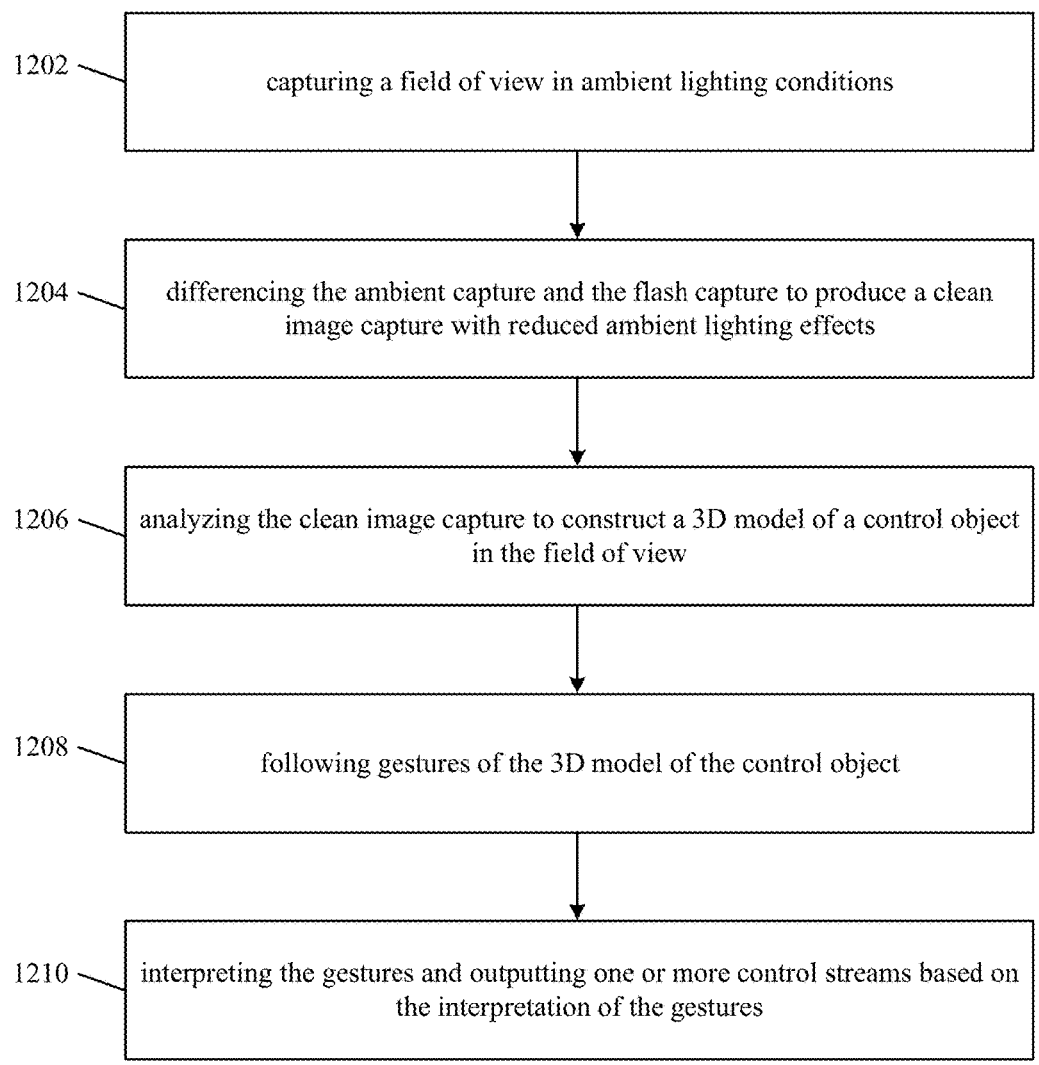
FIG. 12 depicts a representative method of capturing in-air gestures of a control object in a passenger vehicle compartment.

FIG. 12 depicts a representative method 1200 of capturing in-air gestures of a control object in a passenger vehicle compartment. Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

At action 1202, a field of view is captured in ambient lighting conditions.

At action 1204, the field of view is captured while illuminated by a flash. In some implementations, the flash has a duration of 5 to 300 microseconds. In other implementations, the flash has a duration of 5 to 40 microseconds. In one implementation, the flash is produced by six to sixteen LEDs. In another implementation, the flash is produced by LEDs designed to mix wide beams and narrow beams.

In some implementations, the flash is produced by LEDs operating in an ultraviolet frequency range and the capturing further includes using an ultraviolet (UV) sensitive or UV filtered camera. In other implementations, the flash is produced by LEDs operating in an infrared (IR) frequency range and the capturing further includes using an IR sensitive or IR filtered camera.

In one implementation, the flash capture is timed with the flash to reduce capture from ambient lighting. In another implementation, the flash capture duration brackets the flash and lasts no more than four times the flash duration, to reduce capture from ambient lighting.

At action 1206, the ambient capture and the flash capture are differentiated to produce a clean image capture with reduced ambient lighting effects. In one implementation, the differencing to produce clean captures further includes comparing the flash capture to one or more ambient captures immediately before or after the flash capture. In another implementation, the differencing to produce clean captures further includes comparing the flashes capture to two or more ambient captures immediately before and after the flash capture.

At action 1208, the clean image capture is analyzed to construct a 3D model of a control object in the field of view. In some implementations, the method includes one or more sensors alternating between ambient captures and flash captures during at least part of the gesture capture and analysis. In such implementations, the one or more sensors operate, at least part time, at a reduced resolution that is half or less of the available sensor resolution and at an increased capture rate enabled by the reduced resolution.

In other implementations, the method includes one or more sensors capturing binocular views in of at least the flash captures. In such implementations, differencing produces clean binocular captures and the 3D model of the control object is constructed from the clean binocular views.

At action 1210, gestures of the 3D model of the control object are followed by repeatedly producing and analyzing clean image captures of the control object.

At action 1212, the gestures are interpreted and one or more control streams are outputted based on the interpretation of the gestures.

This method and other implementations of the technology disclosed can include one or more of the following features and/or features described in connection with additional methods disclosed.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of recognizing in-air gestures of a control object to control a vehicular control system, the method including:
    determining observation information characterizing in-air gestural motion of a control object from at least one image captured at time t0;
    constructing a three-dimensional model to represent the control object by fitting one or more three-dimensional solid subcomponents modelled in software to a construct of the control object defined by the observation information based on the image captured at time t0;
    responsive to modifications in the observation information based on another image captured at time t1, wherein the control object moved between t0 and t1, improving conformance of the three-dimensional model to the modified observation information by:
   determining an error indication including a difference in space between a point on another construct of the control object defined by the observation information based on the image captured at time t1 and a corresponding point on at least one of the three-dimensional solid subcomponents modelled in software fitted to the construct defined by the observation information based on the image captured at time t0; and responsive to the error indication adjusting the three-dimensional model; and
interpreting motions of the control object wherein the motions are determined based at least in part from the adjusting the three-dimensional model as one or more gestures providing command input to a vehicular control system; wherein the at least one image captured at time t0 and the another image captured at time t1 include:
capturing with a camera an ambient capture for a field of view of the camera in ambient lighting conditions;
illuminating a flash;
capturing with the camera a flash capture for the field of view of the camera while illuminated by the flash;
differencing the ambient capture and the flash capture to produce a clean image capture with reduced ambient lighting effects;
analyzing the clean image capture to construct a three-dimensional model of a control object in the field of view;
tracking, using the three-dimensional model, the control object by repeatedly producing and analyzing clean image captures of the control object and interpreting the gestures and outputting one or more control streams including signal which results in control of a vehicle system based on the interpretation of the gestures; and
wherein one or more sensors alternate between ambient captures and flash captures during at least part of gesture capture and analysis.

2. The method of claim 1, the method further including:
scanning the field of view of the camera by selectively illuminating for short durations respective ones of a pre-determined plurality of directionally oriented light sources that have overlapping fields of illumination;
measuring one or more differences in intensity of returning light emitted from the respective light sources and reflected from a control object in a vehicle environment;
analyzing the reflected light across a series of image frames for periodic brightness variations; and
determining positional information of the control object based at least in part upon one or more measured differences in intensity of the returning light.

3. The method of claim 2, wherein the short durations are in order of 5 to 40 microseconds.

4. The method of claim 2, wherein the pre-determined plurality of directionally oriented light sources includes between six to sixteen light sources.

5. The method of claim 2, wherein a rate of selective illumination of the light sources is determined by measuring one or more frequencies of the periodic brightness variations.

6. The method of claim 2, further including varying a rate of capture of the series of image frames.

7. The method of claim 2, wherein selectively illuminating the respective light sources further includes varying brightness of pairs of overlapping light sources by dimming a first, initially on light source while brightening a second, initially off light source.

8. The method of claim 2, further including capturing the image frames at a low-resolution by analyzing a reduced amount of image data lines per image frame.

9. The method of claim 1, wherein the flash has a duration of 5 to 300 microseconds.

10. The method of claim 1, wherein the flash has a duration of 5 to 40 microseconds.

11. The method of claim 1, wherein the flash is produced by six to sixteen light emitting diodes.

12. The method of claim 1, wherein the flash is produced by light emitting diodes designed to mix wide beams and narrow beams.

13. The method of claim 1, wherein the flash is produced by light emitting diodes operating in an ultraviolet frequency range and the capturing further includes using an ultraviolet (UV) sensitive or UV filtered camera.

14. The method of claim 1, wherein the flash is produced by light emitting diodes operating in an infrared (IR) frequency range and the capturing further includes using an IR sensitive or IR filtered camera.

15. The method of claim 1, wherein the flash capture is timed with the flash to reduce capture from ambient lighting.

16. The method of claim 1, wherein duration of the flash capture lasts no more than four times the duration of the flash.

17. The method of claim 1, wherein the one or more sensors operate, at least part time, at a reduced resolution that is half or less of available sensor resolution and at an increased capture rate enabled by the reduced resolution.

18. The method of claim 1, wherein one or more sensors capture binocular views in of at least the flash captures.

19. The method of claim 18, further including producing clean binocular captures by differencing and constructing the three-dimensional model of the control object from clean binocular views.

20. The method of claim 19, wherein the differencing to produce clean captures further includes comparing the flash capture to one or more ambient captures immediately before or after the flash capture.

21. The method of claim 19, wherein the differencing to produce clean captures further includes comparing the flashes capture to two or more ambient captures immediately before and after the flash capture.

22. The method of claim 1, further including:
capturing at least flash images of a passenger vehicle compartment and creating a 3D model of non-control object features; and
when constructing and following gestures of the 3D model of the control object, taking into account the non-control object features of the passenger vehicle compartment.

* * * * *